United States Patent
Wang et al.

(10) Patent No.: US 12,219,404 B2
(45) Date of Patent: Feb. 4, 2025

(54) BASE STATION SWITCHING METHOD AND APPARATUS

(71) Applicant: Huawei Technologies Co., Ltd., Shenzhen (CN)

(72) Inventors: Zhou Wang, Shenzhen (CN); Yifan Xue, Beijing (CN); Yiru Kuang, Beijing (CN); Jian Wang, Beijing (CN); Haibo Xu, Beijing (CN); Wenqian Huang, Shenzhen (CN); Yifan Du, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 338 days.

(21) Appl. No.: 17/641,361

(22) PCT Filed: Sep. 4, 2020

(86) PCT No.: PCT/CN2020/113446
§ 371 (c)(1),
(2) Date: Mar. 8, 2022

(87) PCT Pub. No.: WO2021/047449
PCT Pub. Date: Mar. 18, 2021

(65) Prior Publication Data
US 2023/0026710 A1 Jan. 26, 2023

(30) Foreign Application Priority Data
Sep. 9, 2019 (CN) .......................... 201910846110.2

(51) Int. Cl.
*H04W 36/00* (2009.01)
*H04W 36/14* (2009.01)
(Continued)

(52) U.S. Cl.
CPC ....... *H04W 36/0005* (2013.01); *H04W 36/14* (2013.01); *H04W 36/362* (2023.05); *H04W 88/06* (2013.01)

(58) Field of Classification Search
None
See application file for complete search history.

(56) References Cited

U.S. PATENT DOCUMENTS 8,428,610 B2 * 4/2013 Chowdhury .......... H04L 47/822
455/445
8,594,670 B2 * 11/2013 Chin ..................... H04W 36/08
455/552.1
(Continued)

FOREIGN PATENT DOCUMENTS

CN 101977437 A 2/2011
CN 102084705 A 6/2011
(Continued)

OTHER PUBLICATIONS

Secretary TSG SA (Maurice Pope, MCC), "Report of TSG SA meeting #82", 3GPP TSG SA Meeting #82, Report, Dec. 12-14, 2018, Sorrento, Italy, 181 pages.

*Primary Examiner* — Faiyazkhan Ghafoerkhan
(74) *Attorney, Agent, or Firm* — Slater Matsil, LLP

(57) ABSTRACT

This application provides a base station switching method and an apparatus. The method includes: A terminal sends one piece of binding signaling that carries SIM card binding information to a source base station; the terminal switches a plurality of SIM cards from being connected to the source base station to being connected to the target base station; and the terminal sends radio resource control reconfiguration complete information to the target base station, where the radio resource control reconfiguration complete information (Continued)

includes information about the plurality of SIM cards that complete the switching operation.

20 Claims, 19 Drawing Sheets

(51) Int. Cl.
  *H04W 36/36* (2009.01)
  *H04W 88/06* (2009.01)

(56) References Cited

U.S. PATENT DOCUMENTS

| | | | | |
|---|---|---|---|---|
| 9,332,468 | B2* | 5/2016 | Sfar | H04W 60/005 |
| 9,913,131 | B2* | 3/2018 | Bai | H04M 15/8038 |
| 11,223,980 | B2* | 1/2022 | Kim | H04W 48/02 |
| 2010/0124933 | A1* | 5/2010 | Chowdhury | H04L 47/70 |
| | | | | 455/453 |
| 2011/0010543 | A1* | 1/2011 | Schmidt | H04W 12/06 |
| | | | | 713/168 |
| 2012/0021726 | A1* | 1/2012 | Fu | H04W 8/205 |
| | | | | 455/412.1 |
| 2012/0021744 | A1* | 1/2012 | Chin | H04W 36/08 |
| | | | | 455/436 |
| 2014/0135007 | A1* | 5/2014 | Yu | H04W 24/02 |
| | | | | 455/436 |
| 2015/0215773 | A1* | 7/2015 | Bai | H04M 17/026 |
| | | | | 455/418 |
| 2015/0237502 | A1* | 8/2015 | Schmidt | G06F 21/44 |
| | | | | 726/7 |
| 2015/0245195 | A1* | 8/2015 | Zhao | H04W 12/37 |
| | | | | 455/418 |
| 2016/0212791 | A1* | 7/2016 | Ko | H04W 76/18 |
| 2018/0160300 | A1* | 6/2018 | Bai | H04M 17/02 |
| 2018/0279188 | A1* | 9/2018 | Tenny | H04W 36/0016 |
| 2018/0279406 | A1* | 9/2018 | Agarwal | H04W 72/23 |
| 2019/0320353 | A1* | 10/2019 | Kim | H04W 48/02 |
| 2022/0264405 | A1* | 8/2022 | Hong | H04W 36/08 |
| 2023/0026710 | A1* | 1/2023 | Wang | H04W 36/14 |

FOREIGN PATENT DOCUMENTS

| | | |
|---|---|---|
| CN | 102440027 A | 5/2012 |
| CN | 103460756 A | 12/2013 |
| CN | 109309943 A | 2/2019 |
| CN | 109479309 A | 3/2019 |
| CN | 109542625 A | 3/2019 |
| CN | 110495208 A | 11/2019 |
| GB | 680892 A | 10/1952 |
| WO | 2014201689 A1 | 12/2014 |
| WO | 2015199487 A1 | 12/2015 |
| WO | 2018141148 A1 | 8/2018 |
| WO | 2018172002 A1 | 9/2018 |

* cited by examiner

BASE STATION SWITCHING METHOD AND APPARATUS

CROSS-REFERENCE TO RELATED APPLICATIONS

This application is a National Stage of International Application No. PCT/CN2020/113446, filed on Sep. 4, 2020, which claims priority to Chinese Patent Application No. 201910846110.2, filed on Sep. 9, 2019, both of which are hereby incorporated by reference in their entireties.

TECHNICAL FIELD

This application relates to the field of wireless communication, and in particular, to a base station switching method and an apparatus.

BACKGROUND

Normal use of UE (User Equipment, terminal) depends on a SIM (Subscriber Identification Module, subscriber identification module) card disposed inside the UE. After the SIM card is bound to a user identity and is authenticated, the user may use the UE with the SIM card to implement operations such as a call, a video conference, and Internet access by exchanging signals with a base station of a surrounding operator.

In actual application, some users need to use different phone numbers for calls or video conferences for different persons, or subscribe to data plans of a plurality of SIM cards to enjoy more traffic preferences. One SIM card corresponds to one phone number, and a user can subscribe to a data plan only once in a same usage period with one phone number. In this case, to meet user requirements for calls, video conferencing, and Internet access, more users choose to use multi-card UE with a plurality of SIM cards.

Each SIM card in the multi-card UE is used to exchange signals with a base station of a surrounding operator, to implement operations such as a call, a video conference, and Internet access. When a location of the multi-card UE used by the user changes, or a signal of a base station currently connected to the multi-card UE is poor, the base station corresponding to the multi-card UE may change. In this case, each SIM card in the multi-card UE needs to send a switching request to a new available base station, complete cell switching from the base station currently connected to the multi-card UE to the new available base station based on a configuration parameter fed back by the new available base station, and connect to the new available base station, so as to ensure normal use of operations such as a call, a video conference, and Internet access.

SUMMARY

This application provides a base station switching method and an apparatus, to resolve a problem of low switching efficiency when a terminal having a plurality of SIM cards switches between base stations.

According to a first aspect, this application provides a base station switching method, applied to a terminal having a plurality of SIM cards.

In the method provided in this application, in a base station switching process, the terminal first sends one piece of binding signaling that carries SIM card binding information to a source base station. In this way, a switching request may be sent for the plurality of SIM cards in the terminal by using one piece of switching request signaling, so that an amount of signaling required for the plurality of SIM cards in the base station switching operation process can be reduced, and correspondingly, a time required by the plurality of SIM cards in the base station switching operation process can be reduced. After receiving radio resource control reconfiguration information sent by the source base station, the terminal may instruct the plurality of SIM cards to connect to a target base station, to complete base station switching. After the plurality of SIM cards in the terminal complete base station switching, the terminal sends radio resource control reconfiguration complete information to the target base station, to notify the target base station of information about the SIM cards that complete the switching operation.

The information about the plurality of SIM cards includes identification information of the plurality of SIM cards. The identification information may be one or more of an international mobile equipment identity, a mobile equipment identifier, an international mobile subscriber identity, a temporary mobile subscriber identity, a packet-temporary mobile subscriber identity, an integrate circuit card identity, a mobile subscriber ISDN number, a mobile station roaming number, a product serial number, and a radio network temporary identity. The plurality of SIM cards can be effectively distinguished from each other by using the identification information, so that each SIM card in the terminal can accurately obtain information such as a matched configuration parameter by using the identification information in the base station switching process, thereby improving effectiveness of base station switching by each SIM card in the terminal.

To determine a specific handover scenario of the base station switching performed by the SIM cards, the information about the plurality of SIM cards may include a type of a source core network connected to the plurality of SIM cards. The target base station may accurately determine, based on the type of the source core network connected to the SIM cards and a type of a core network provided by the target base station, a handover scenario of the SIM cards, so that each SIM card in the terminal performs a corresponding core network type switching process, to ensure that the SIM card can normally use a network after switching.

The SIM card binding information may include a binding relationship between the plurality of SIM cards. A specific representation, for example, a specific identifier or a description field, is used to indicate that the plurality of SIM cards have been bound, thereby reducing a probability that the source base station incorrectly determines whether the plurality of SIM cards have been bound or a specific SIM card that has a binding relationship.

Further, 1/0 may be used to indicate whether the plurality of SIM cards are bound. When the SIM card binding information is represented by 1, it indicates that the plurality of SIM cards are bound. When the SIM card binding information is represented by 0, it indicates that the plurality of SIM cards are not bound. In related processors of the terminal, the source base station, and the target base station, for example, a computer and a server, a binary operation is usually used. Correspondingly, using 1/0 to indicate whether the plurality of SIM cards are bound can facilitate an operation of binding signaling in the terminal, the source base station, and the target base station.

That a radio resource control status between a SIM card in the terminal and the source base station is in the connected state is one of basic conditions for the SIM card to be switched to the target base station. In an optional implementation, to ensure that the plurality of SIM cards are in the connected state, before the terminal receives the radio resource control reconfiguration information sent by the source base station, the terminal first receives a terminal status switching instruction sent by the source base station, and instructs, according to the terminal status switching instruction, the SIM cards to switch the statuses between the SIM cards and the source base station to the connected state, so as to ensure that the plurality of SIM cards can be effectively switched to the target base station.

After the terminal completes the switching operation of the plurality of SIM cards, in an optional implementation, the terminal may send, to the target base station at a time, radio resource control reconfiguration complete information that includes the SIM card binding information, so that the terminal can send the radio resource control reconfiguration complete information to the target base station by using one piece of signaling, thereby effectively reducing an amount of signaling transmitted between the terminal and the target base station, and shortening total duration of signaling transmission between the terminal and the target base station.

In another optional implementation, the terminal may send the radio resource control reconfiguration complete information to the target base station at a plurality of times. Each piece of sub-radio resource control reconfiguration complete information includes information about a single SIM card in the plurality of SIM cards that completes the switching operation. In this way, when any SIM card completes the switching operation, the terminal may send radio resource control reconfiguration complete information about the SIM card to the target base station in real time, so that the target base station ends switching monitoring on the SIM card. This reduces resource occupation of the target base station.

According to a second aspect, this application provides a base station switching method, applied to a source base station connected to a terminal having a plurality of SIM cards.

In the method provided in this application, after receiving one piece of binding signaling that carries SIM card binding information and that is sent by the terminal, the source base station sends, to the target base station, one piece of switching request signaling that carries the SIM card binding information. Therefore, the source base station may initiate a switching request for the plurality of SIM cards in the terminal by using one piece of switching request signaling, so that an amount of signaling between the source base station and the target base station can be effectively reduced, and correspondingly, a time required for transmitting signaling can be reduced. Then, the source base station sends radio resource control reconfiguration information fed back by the target base station to the terminal, so that the plurality of SIM cards in the terminal are switched to the target base station.

That a radio resource control status between a SIM card in the terminal and the source base station is in a connected state is one of basic conditions for the SIM card to be switched to the target base station. In an optional implementation, to ensure that the plurality of SIM cards are in the connected state, after the source base station receives the SIM card binding information sent by the terminal, the source base station generates a terminal status switching instruction based on information about radio resource control statuses between the plurality of SIM cards and the source base station, and sends the terminal status switching instruction to the terminal, to instruct a SIM card in the plurality of SIM cards that is in a non-connected state to switch a status between the SIM card and the source base station to the connected state, so as to ensure that the plurality of SIM cards can be effectively switched to the target base station.

In a process in which the source base station receives the radio resource control reconfiguration information sent by the target base station, in an optional implementation, the source base station receives the radio resource control reconfiguration information sent by the target base station at a time. The radio resource control reconfiguration information includes the SIM card binding information and configuration parameters used to connect the plurality of SIM cards to the target base station.

In a process in which the source base station sends the radio resource control reconfiguration information to the terminal, in an optional implementation, the source base station may send, to the terminal at a time, the SIM card binding information and the configuration parameters used to connect the plurality of SIM cards to the target base station, that is, the radio resource control reconfiguration information. In this way, the source base station can send the configuration parameters related to the plurality of SIM cards to the terminal by using one piece of signaling, so as to effectively reduce an amount of signaling between the source base station and the terminal and a time used for signaling transmission.

In another optional implementation, the source base station may send the radio resource control reconfiguration information to the terminal at a plurality of times, where each piece of sub-radio resource control reconfiguration information includes information about a single SIM card in the plurality of SIM cards and a configuration parameter used to connect the single SIM card to the target base station. In this way, after obtaining the configuration parameters for connecting the plurality of SIM cards to the target base station, the source base station may send the sub-radio resource control reconfiguration information to the terminal, to improve accuracy of correspondence between a configuration parameter and a single SIM card, and ensure quality of information transmission between the source base station and the terminal.

According to a third aspect, this application provides a base station switching method, applied to a target base station connected to a terminal having a plurality of SIM cards.

In the method provided in this application, by receiving one piece of switching request signaling that includes SIM card binding information and that is sent by a source base station, the target base station may receive a base station switching request for the plurality of SIM cards at a time, and generate radio resource control reconfiguration information corresponding to the plurality of SIM cards, so that an amount of signaling between the source base station and the target base station and a time for transmitting the signaling can be effectively reduced. After receiving radio resource control reconfiguration complete information sent by the terminal, the target base station completes switching monitoring for the plurality of SIM cards in the terminal.

In a process in which the target base station sends the radio resource control reconfiguration information to the source base station, in an optional implementation, the target base station may send the radio resource control reconfiguration information to the source base station at a time. In this case, the radio resource control reconfiguration information includes the SIM card binding information and configuration parameters used to connect the plurality of SIM cards to the target base station. In this way, the target base station may send, to the source base station by using one piece of signaling, the configuration parameters related to the plurality of SIM cards, so as to effectively reduce an amount of signaling between the target base station and the source base station and a total time for transmitting the signaling.

In another optional implementation, the target base station may send the radio resource control reconfiguration information to the source base station at a plurality of times. In this case, the radio resource control reconfiguration information includes a plurality of pieces of sub-radio resource control reconfiguration information, and each piece of sub-radio resource control reconfiguration information includes information about a single SIM card in the plurality of SIM cards and a configuration parameter used to connect the single SIM card to the target base station. In this way, when the target base station generates a configuration parameter for connecting one of the plurality of SIM cards to the target base station, the target base station may send the configuration parameter to the source base station in real time, to shorten waiting duration of the source base station, and improve timeliness of information transmission between the source base station and the target base station.

To avoid a problem that the switching cannot be effectively performed due to a connection limit set by the target base station, in an optional implementation, before generating the radio resource control reconfiguration information, the target base station needs to first obtain a current quantity of connected SIM cards. If the current quantity of connected SIM cards is greater than a preset SIM card quantity threshold, it indicates that the target base station cannot continue to connect to a SIM card, the target base station needs to send a switching prohibition response to the source base station, and the source base station notifies the terminal to end the switching operation. In this way, effectiveness of terminal switching can be ensured, and a resource waste caused because the terminal still attempts to perform switching when the terminal cannot perform switching due to the connection limit set by the target base station can be avoided. In addition, connection quality of the SIM card to the target base station can be ensured, and a case in which the SIM card cannot normally use a network after the SIM card is forcibly connected to the target base station or a case in which a SIM card of another terminal connected to the target base station cannot normally use a network can be avoided.

According to a fourth aspect, this application provides a terminal having a plurality of SIM cards, including a transmitter, a receiver, and one or more processors. The transmitter is configured to send computer instructions, the receiver is configured to receive the computer instructions, and when the processor executes the computer instructions, the terminal having a plurality of SIM cards performs the corresponding base station switching method.

According to a fifth aspect, this application provides a source base station connected to a terminal having a plurality of SIM cards, and the source base station includes a transmitter, a receiver, and one or more processors. The transmitter is configured to send computer instructions, the receiver is configured to receive the computer instructions, and when the processor executes the computer instructions, the source base station performs the corresponding base station switching method.

According to a sixth aspect, this application provides a target base station connected to a terminal having a plurality of SIM cards, and the target base station includes a transmitter, a receiver, and one or more processors. The transmitter is configured to send computer instructions, the receiver is configured to receive the computer instructions, and when the processor executes the computer instructions, the target base station performs the corresponding base station switching method. According to a seventh aspect, this application provides a computer storage medium. The computer-readable storage medium stores computer instructions, and when the computer instructions are run on a terminal having a plurality of SIM cards, the terminal having a plurality of SIM cards is enabled to perform the base station switching method according to the first aspect and the embodiments of the first aspect.

According to an eighth aspect, this application provides a computer storage medium. The computer-readable storage medium stores computer instructions, and when the computer instructions are run on a source base station connected to a terminal having a plurality of SIM cards, the source base station is enabled to perform the base station switching method according to the second aspect and the embodiments of the second aspect.

According to a ninth aspect, this application provides a computer storage medium. The computer-readable storage medium stores computer instructions, and when the computer instructions are run on a target base station connected to a terminal having a plurality of SIM cards, the target base station is enabled to perform the base station switching method according to the third aspect and the embodiments of the third aspect.

According to a tenth aspect, this application provides a computer program product including instructions. When the computer program product runs on a terminal having a plurality of SIM cards, the terminal having a plurality of SIM cards is enabled to perform the base station switching method according to the first aspect and the embodiments of the first aspect. According to an eleventh aspect, this application provides a computer program product including instructions. When the computer program product runs on a source base station connected to a terminal having a plurality of SIM cards, the source base station is enabled to perform the base station switching method according to the second aspect and the embodiments of the second aspect.

According to a twelfth aspect, this application provides a computer program product including instructions. When the computer program product runs on a target base station connected to a terminal having a plurality of SIM cards, the target base station is enabled to perform the base station switching method according to the third aspect and the embodiments of the third aspect.

According to a thirteenth aspect, this application provides a chip system. The chip system is configured to support a terminal having a plurality of SIM cards in implementing the base station switching method according to the first aspect and the embodiments of the first aspect.

According to a fourteenth aspect, this application provides a chip system. The chip system is configured to support a source base station connected to a terminal having a plurality of SIM cards in implementing the base station switching method according to the second aspect and the embodiments of the second aspect.

According to a fifteenth aspect, this application provides a chip system. The chip system is configured to support a target base station connected to a terminal having a plurality of SIM cards in implementing the base station switching method according to the third aspect and the embodiments of the third aspect.

According to a sixteenth aspect, this application provides a communications system, including one or more communications devices or one or more communications apparatuses. The communications device or the communications apparatus may include apparatuses, units, modules, or the like configured to perform the steps in the methods in the foregoing aspects. The communications device or the communications apparatus may be disposed on a base station or a terminal, or may be the base station or the terminal, or may be a component of the base station or the terminal.

BRIEF DESCRIPTION OF THE DRAWINGS

To describe the technical solutions in this application more clearly, the following briefly describes the accompanying drawings required for describing the embodiments. It is clear that persons of ordinary skill in the art may derive other drawings from these accompanying drawings without creative efforts.

ILLUSTRATION

1—terminal, 2—plug-in port, 3—first card slot, 4—second card slot, 5—first SIM card, 6—second SIM card, 10—antenna, 101—mobile communications module, 11—transmitter, 12—receiver, 13—processor, 21—transmitter, 22—receiver, 23—processor, 31—transmitter, 32—receiver, and 33—processor.

DETAILED DESCRIPTION OF ILLUSTRATIVE EMBODIMENTS

Before the technical solutions in the embodiments of this application are described, a technical scenario in the embodiments of this application is first described with reference to the accompanying drawings.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more than two.

Figure 1:
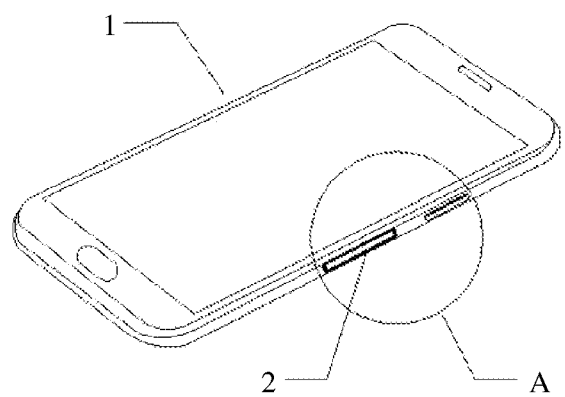
FIG. 1 is a schematic diagram of a structure of a terminal.
Figure 2:
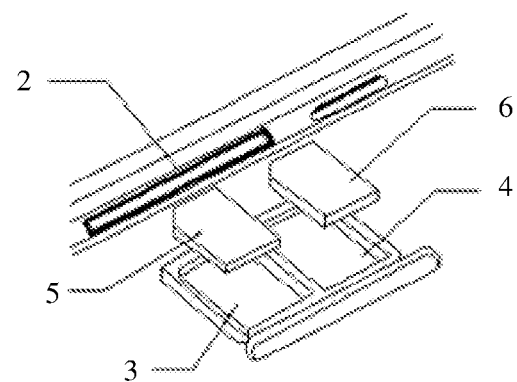
FIG. 2 is a schematic diagram of an internal structure of a plug-in port at a position A of a terminal having a plurality of SIM cards.

In a use process of a terminal, the terminal may be connected to a surrounding base station by using a SIM card carried in the terminal, and exchange a signal with the base station. The terminal may be a device that can use a SIM card, such as a mobile phone, a portable Wi-Fi (Wireless Fidelity, wireless broadband) terminal, a tablet computer, or a smartwatch. Generally, a plug-in port is disposed in the terminal for inserting a SIM card into the terminal. For example, FIG. 1 shows a schematic diagram of a structure of a terminal. A plug-in port 2 connected to the inside of the terminal 1 is disposed on the terminal 1. To meet a requirement of a user that a plurality of SIM cards can be carried and used in a same terminal at the same time, more terminals have a structure in which a plurality of SIM cards can be inserted at the same time. FIG. 2 is a schematic diagram of an internal structure of a plug-in port at a position A of a terminal having a plurality of SIM cards. A card holder including a first card slot 3 and a second card slot 4 may be inserted into the plug-in port 2, and a first SIM card 5 and a second SIM card 6 may be placed into the first card slot 3 and the second card slot 4. In this way, the terminal 1 can carry and use two SIM cards at the same time. It may be understood that, based on an actual requirement of a user and an actual product of a manufacturer, the terminal may carry more than two SIM cards, that is, a quantity of card slots is correspondingly increased, and required SIM cards are inserted into the card slots.

It should be noted that the terminal having a plurality of SIM cards provided in this application is in a multi-SIM multi-standby multi-pass mode or a multi-SIM multi-standby single-pass mode. In other words, a plurality of SIM cards in the terminal are in a use mode in which the plurality of SIM cards can be in a standby state at the same time. Dual-SIM dual-standby single-pass and dual-SIM dual-standby dual-pass are used as examples. Dual-SIM dual-standby single-pass means that two SIM cards can be inserted into a phone at the same time and support two different network modes, the two SIM cards can be in standby mode at the same time, but when one SIM card is in a call, a call for the other SIM card cannot be made and a prompt indicating that the call is in progress is provided. Dual-SIM dual-standby dual-pass means that two SIM cards can be inserted into a phone at the same time and support two different network modes, the two SIM cards can be in standby mode at the same time, and when one SIM card is in a call, and when there is an incoming call for the other SIM card, the incoming call is displayed and can be transferred. The terminal 1 shown in FIG. 1 and FIG. 2 is used as an example. The first SIM card 5 and the second SIM card 6 may be in the dual-card dual-standby dual-pass mode or the dual-card dual-standby single-pass mode. In a process of using the terminal 1, both the first SIM card 5 and the second SIM card 6 may exchange signals with a surrounding base station.

Figure 3:
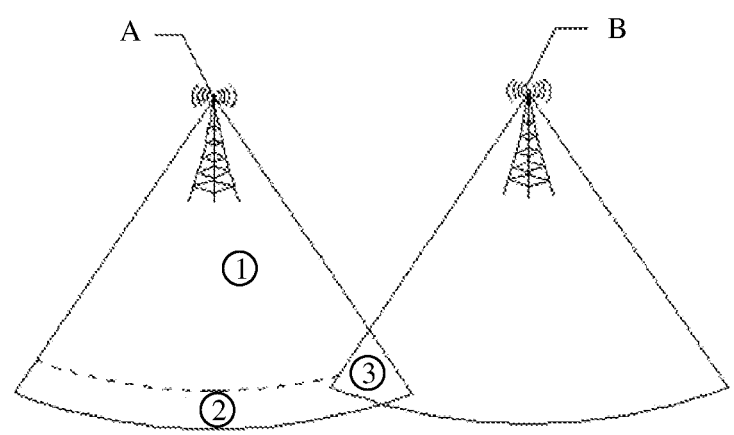
FIG. 3 is a schematic diagram of division of coverage areas of base stations.

Generally, a base station has a signal coverage area of a specific size, which may also be referred to as a coverage area of a cell. FIG. 3 shows a schematic diagram of division of coverage areas of base stations. An area 1 is a signal coverage area of a base station A. If a terminal moves outside the area 1, the terminal may fail to connect to the base station A. An area 2 is an edge area of the area 1, and a signal of the base station A in the area 2 is usually weak. If the terminal is placed in the area 2, a connection between the terminal and the base station A may be unstable. To avoid a case in which the terminal has no available base station, a signal coverage network is usually formed by using signal coverage areas of a plurality of base stations, to eliminate a signal-free area. In this case, signal coverage areas of two base stations may overlap. As shown in FIG. 3, an area 3 is an intersection area of signal coverage areas of the base station A and a base station B. If the terminal is in the area 3, the terminal can receive signals from both the base station A and the base station B, and a problem that the terminal connects to which base station may occur. If a function of the base station A is faulty, especially a function for connection between the base station A and the terminal is faulty, the terminal may fail to connect to the base station A. If a position of the terminal changes, especially when the terminal moves from the area 1 to the area 2, or moves from the area 1 to the area 3, or moves from the area 2 to the area 3, or moves from the area 3 to the area 2, or moves out of the area 1, a connection between the terminal and the base station A may be affected.

The terminal measures a base station signal through radio resource management (Radio Resource Management, RRM), and determines, based on the measured base station signal, whether the foregoing case occurs on the terminal. If a case in the foregoing cases occurs, where the case is not limited to the foregoing cases, the terminal needs to perform cell handover, that is, a connection between the terminal and the base station A needs to be switched to a new base station. In this application, a base station connected to the terminal before base station switching may be referred to as a source base station (Source NodeB), and a base station to be connected to the terminal after base station switching may be referred to as a target base station (Target NodeB).

Figure 4:
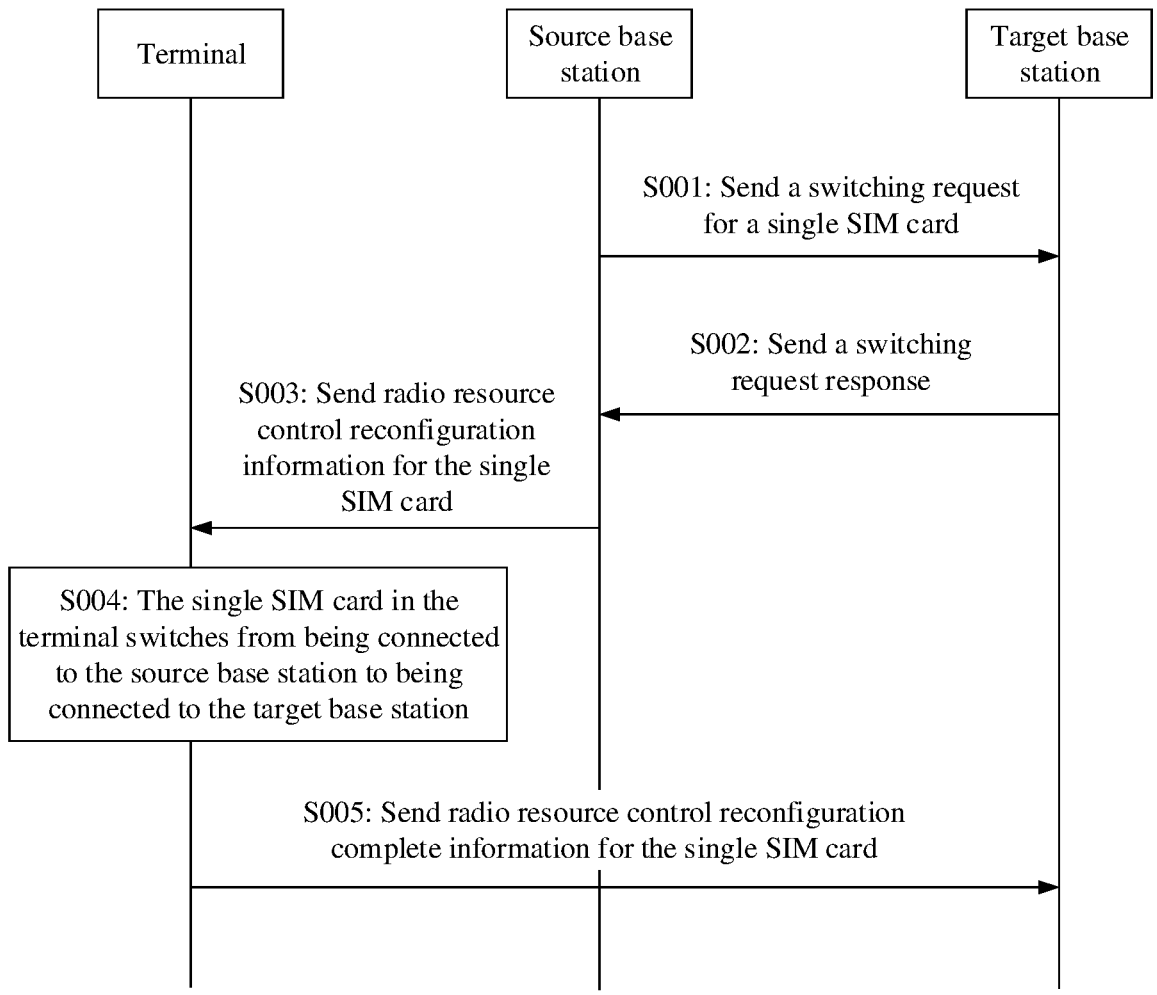
FIG. 4 is a schematic flowchart of base station switching for each SIM card in a terminal having a plurality of SIM cards.

The following uses the terminal 1 shown in FIG. 1 and FIG. 2 as an example to describe an implementation. The first SIM card 5 and the second SIM card 6 are both connected to the source base station. When base station switching occurs, both the first SIM card 5 and the second SIM card 6 need to be connected to the target base station. FIG. 4 is a schematic flowchart of base station switching for each SIM card in a terminal having a plurality of SIM cards. As shown in FIG. 4, the first SIM card 5 is used as an example. When base station switching needs to be performed, a switching procedure of the first SIM card 5 is as follows:

S001: A source base station sends a switching request for a single SIM card to a target base station.

S002: The target base station sends radio resource control reconfiguration information to the source base station.

S003: The source base station sends the radio resource control reconfiguration information for the single SIM card to the terminal.

S004: The single SIM card in the terminal switches from being connected to the source base station to being connected to the target base station.

S005: The terminal sends radio resource control reconfiguration complete information for the single SIM card to the target base station.

Referring to the foregoing procedure, the second SIM card 6 also needs to go through the same procedure in a base station switching process. It can be learned that there are a large quantity of repeated base station switching steps for the first SIM card 5 and the second SIM card 6, and only related information carried in signaling corresponding to each repeated step is different. Consequently, a total time required by the terminal to complete base station switching is relatively long. In addition, signaling transmission between the first SIM card 5 and the second SIM card 6 and the source base station, and signaling transmission between the first SIM card 5 and the second SIM card 6 and the target base station are completed through an air interface (National Instruments) or New Radio (New Radio). There is corresponding signaling in each step corresponding to base station switching for the first SIM card 5 and the second SIM card 6. Therefore, more steps required for base station switching for the first SIM card 5 and the second SIM card 6 correspondingly indicate more signaling transmitted through the air interface or New Radio. This not only increases signaling overheads, but also occupies air interface resources for a long time. In addition, to support the foregoing operations, a large amount of power of the terminal needs to be consumed, resulting in a waste of power consumption. If the terminal has more SIM cards, correspondingly, in a base station switching process of each SIM card, S001 to S005 need to be correspondingly performed. In this way, a total time required by the terminal to complete base station switching is longer, and a waste of resources such as signaling, air interfaces, and terminal power is more serious.

To resolve a problem that efficiency of base station switching by a terminal is low and resources are seriously wasted, the following embodiments provide a base station switching method.

Embodiment (1)

Figure 5:
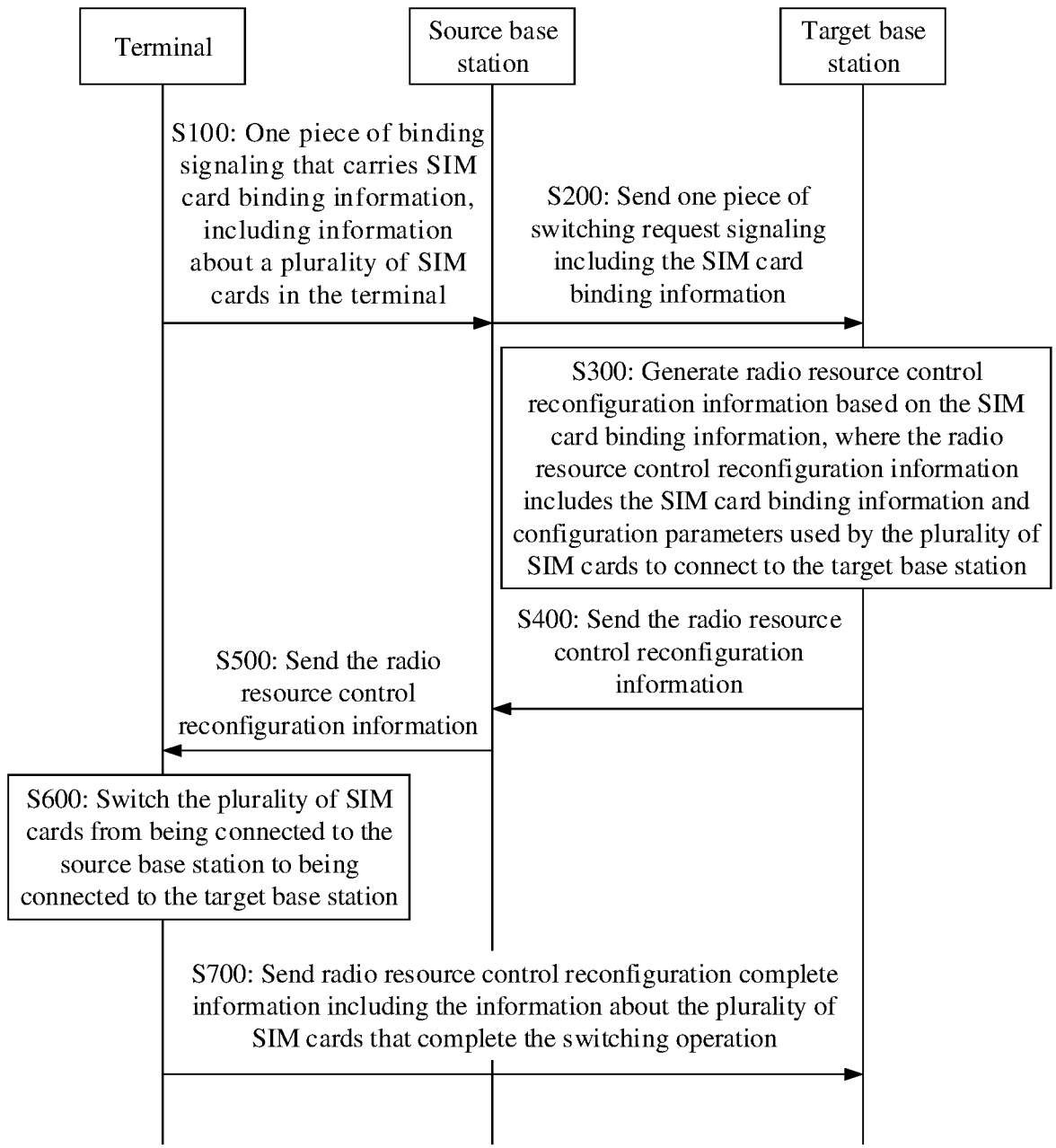
FIG. 5 shows a schematic flowchart of a base station switching method.

FIG. 5 shows a schematic flowchart of a base station switching method. The following describes this embodiment with reference to FIG. 5.

S100: A terminal sends one piece of binding signaling that carries SIM card binding information to a source base station, where the SIM card binding information includes information about a plurality of SIM cards in the terminal.

S200: The source base station sends one piece of switching request signaling to a target base station, where the switching request signaling includes the SIM card binding information.

S300: The target base station generates radio resource control reconfiguration information based on the information about the plurality of SIM cards, where the radio resource control reconfiguration information includes the information about the plurality of SIM cards and configuration parameters used by the plurality of SIM cards to connect to the target base station.

S400: The target base station sends the radio resource control reconfiguration information to the source base station.

S500: The source base station sends the radio resource control reconfiguration information to the terminal.

S600: The terminal switches the plurality of SIM cards from being connected to the source base station to being connected to the target base station.

S700: The terminal sends radio resource control reconfiguration complete information to the target base station, where the radio resource control reconfiguration complete information includes the information about the plurality of SIM cards that complete the switching operation.

First, the terminal sends the SIM card binding information of the plurality of SIM cards inside the terminal to the source base station by using a transmitter (for example, including a radio frequency chip and an antenna module). The terminal establishes a communication connection to the source base station by using a SIM card inside the terminal, and sends the signaling that carries the SIM card binding information to the source base station. Generally, the terminal may choose to send the binding signaling that carries the SIM card binding information to the source base station by using a primary card. Generally, the primary card is a SIM card with the highest use priority in the terminal having the plurality of SIM cards. The use priority may be set according to card slots, or manually set by a user, or set according to a system configuration of the terminal, or the like. Correspondingly, a SIM card other than the primary card in the terminal having the plurality of SIM cards may be referred to as a secondary card. In this application, there is at least one secondary card. Generally, the SIM card binding information includes the information about the plurality of SIM cards. When the information about the plurality of SIM cards is packaged and sent to the source base station by using one piece of binding signaling, it may be considered by default that the plurality of SIM cards are successfully bound. In this application, binding means that information about bound SIM cards may be sent at the same time, and the bound SIM cards may receive feedback information at the same time. In other words, the bound SIM cards may send a switching request by using the same signaling, and receive a response to the switching request by using one piece of signaling. For example, a terminal A has a SIM card a, a SIM card b, and a SIM card c. If the SIM card a is determined as a primary card based on a use priority, the SIM card b and the SIM card c are secondary cards. The terminal A may send, to the source base station by using the SIM card a, one piece of binding signaling that carries SIM card binding information. The SIM card binding information includes information about the SIM card a, the SIM card b, and the SIM card c. In this case, it is considered that the SIM card a, the SIM card b, and the SIM card c are successfully bound.

After the source base station receives the binding signaling that carries the SIM card binding information and that is sent by the terminal, it indicates that the source base station already has a function of sending a switching request for a plurality of SIM cards by using one piece of signaling. In this case, the switching request includes the SIM card binding information, and the switching request indicates that the plurality of SIM cards all request base station switching. It can be learned that, the base station switching method provided in this embodiment can effectively reduce an amount of signaling between the source base station and the target base station, and shorten total duration of transmitting the signaling on this basis.

After receiving the SIM card binding information sent by the source base station, the target base station correspondingly generates the radio resource control reconfiguration (Radio Resource Control Reconfiguration) information based on the information about the plurality of SIM cards in the SIM card binding information. The radio resource control reconfiguration information includes the information about the plurality of SIM cards and configuration parameters used by the plurality of SIM cards to connect to the target base station. There is a mapping relationship between the information about the plurality of SIM cards and the configuration parameters used by the plurality of SIM cards to connect to the target base station. To avoid a case in which a SIM card cannot connect to the target base station after using a non-mapped configuration parameter, both the information about the plurality of SIM cards and the configuration parameters used by the plurality of SIM cards to connect to the target base station need to be carried in the radio resource control reconfiguration information, so that the information about the plurality of SIM cards is accurately mapped to the configuration parameters. Specifically, the configuration parameters used by the plurality of SIM cards to connect to the target base station may include a radio access technology type (Radio Access Technology Type, RAT-Type), a radio access technology message container (Radio Access Technology Message Container), a non-access stratum security parameter from New Radio (Non-Access Stratum Security Param from NR), a late non-critical extension (Late Non-Critical Extension) instruction, a non-critical extension (Non-Critical Extension) instruction, and the like.

The target base station sends the generated radio resource control reconfiguration information to the source base station in a form of a switching request response. After receiving the radio resource control reconfiguration information sent by the target base station, the source base station continues to send the radio resource control reconfiguration information to the terminal, so that the terminal is connected to the target base station.

After the terminal receives the radio resource control reconfiguration information sent by the source base station, each SIM card in the terminal determines, based on the information about the plurality of SIM cards in the radio resource control reconfiguration information and the mapping relationship between the information about the plurality of SIM cards and the configuration information used by the plurality of SIM cards to connect to the target base station, a configuration parameter used by the SIM card to connect to the target base station. Each SIM card is connected to the target base station by using the corresponding configuration parameter, to complete a switching operation.

After completing the base station switching operation for the plurality of SIM cards, the terminal may send the radio resource control reconfiguration complete (Radio Resource Control Reconfiguration Complete) information to the target base station. When a quantity of SIM cards included in the radio resource control reconfiguration complete information that is received by the target base station and that is sent by the terminal is equal to a quantity of the plurality of SIM cards in the terminal, it indicates that all the SIM cards have completed the switching operation, that is, this switching operation is completed.

It can be learned from the foregoing description that, in the base station switching method provided in this embodiment, the plurality of SIM cards in the terminal are enabled to have a binding relationship, so that a switching request can be sent for the plurality of SIM cards by using one piece of switching request signaling. This can effectively reduce an amount of signaling corresponding to one or more processes of sending signaling from the source base station to the target base station, from the target base station to the source base station, from the source base station to the terminal, and from the terminal to the target base station in a base station switching operation process for the plurality of SIM cards. Correspondingly, a time required by the plurality of SIM cards in the base station switching operation process can be effectively reduced.

Embodiment (2)

According to the method in Embodiment (1), the information about the plurality of SIM cards includes identification information of each SIM card, and the identification information may be used by the source base station and the target base station to identify identities of the SIM cards and obtain related information of the SIM cards. The identification information may be one or more of an IMEI (International Mobile Equipment Identity, international mobile equipment identity), an MEID (Mobile Equipment Identifier, mobile equipment identifier), an IMSI (International Mobile Subscriber Identification Number, international mobile subscriber identity), a TMSI (Temporary Mobile Subscriber Identity, temporary mobile subscriber identity), a P-TMSI (Packet-Temporary Mobile Subscriber Identity, packet-temporary mobile subscriber identity), an ICCID (Integrate Circuit Card Identity, integrate circuit card identity), an MSISDN (Mobile Subscriber International ISDN/PSTN Number, mobile subscriber ISDN number), an MSRN (Mobile Station Roaming Number, mobile station roaming number), an SN (Serial Number, product serial number), and an RNTI (Radio Network Temporary Identity, radio network temporary identity). The plurality of SIM cards can be effectively distinguished from each other by carrying the identification information, so that each SIM card in the terminal can accurately obtain information such as a matched configuration parameter by using the identification information in the base station switching process, thereby improving effectiveness of base station switching by each SIM card in the terminal.

Further, if identification information of a SIM card includes only one piece of the foregoing identification information, the source base station and the target base station may deduce other identification information based on the identification information. However, this process of deducing other identification information needs to consume some resources and time. To reduce load generated in the foregoing deducing process, a plurality of or all types of identification information in the foregoing identification information may be selected as the identification information of one SIM card.

Embodiment (3)

According to the method in Embodiment (1) or Embodiment (2), it should be noted that the base station switching operation requires that the plurality of SIM cards in the terminal and the source base station are in a radio resource control connected (Radio Resource Control Connected, RRC_CONNECTED) state. Generally, if a SIM card in the terminal supports a 3G network or a 4G network, the SIM card may have a radio resource control idle (Radio Resource Control Idle, RRC_IDLE) state and an RRC_CONNECTED state. If the SIM card in the terminal can support a 5G network, the SIM card may further have a radio resource control inactive (Radio Resource Control Inactive, RRC_INACTIVE) state. The foregoing three RRC states may be switched to each other.

To ensure that each SIM card in the terminal is in the RRC_CONNECTED state, the binding signaling sent by the terminal to the source base station needs to carry RRC statuses of the plurality of SIM cards. To be specific, the information about the plurality of SIM cards in the SIM card binding information includes information about radio resource control statuses between the plurality of SIM cards and the source base station, so that the source base station indicates, based on the information about the radio resource control statuses between the plurality of SIM cards and the source base station, a SIM card in the RRC_IDLE state and a SIM card in the RRC_INACTIVE state in the terminal to switch to the RRC_CONNECTED state, so as to ensure effectiveness of a base station switching process for the plurality of SIM cards in the terminal.

Embodiment (4)

Figure 6:
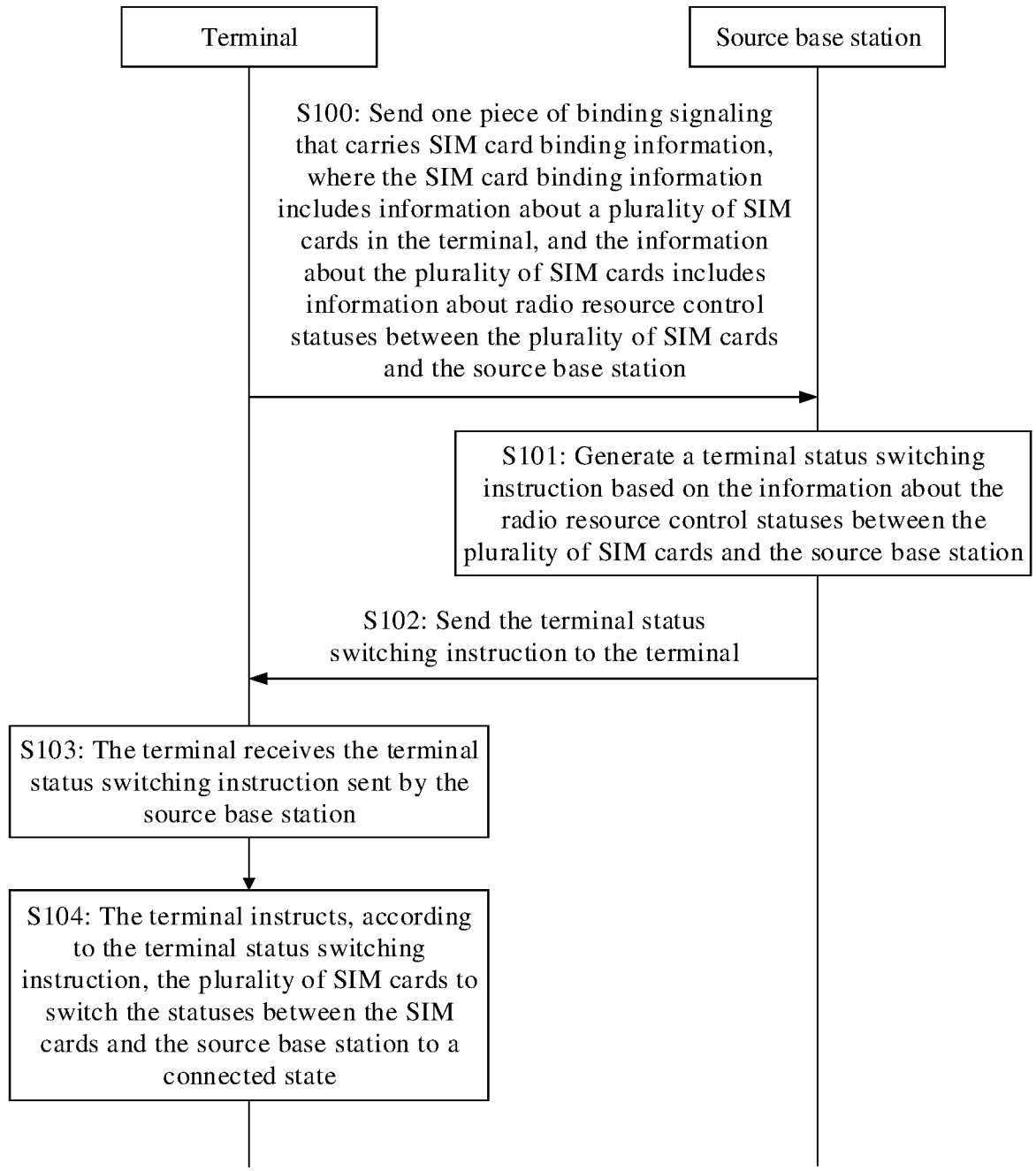
FIG. 6 is a schematic flowchart of switching an RRC status of a SIM card.

According to the method in Embodiment (3), RRC statuses of a plurality of SIM cards in the terminal are switched according to the schematic flowchart of RRC status switching of a SIM card shown in FIG. 6.

S100: The terminal sends one piece of binding signaling that carries SIM card binding information to a source base station, where the SIM card binding information includes information about the plurality of SIM cards in the terminal, and the information about the plurality of SIM cards includes information about radio resource control statuses between the plurality of SIM cards and the source base station.

S101: The source base station generates a terminal status switching instruction based on the information about the radio resource control statuses between the plurality of SIM cards and the source base station.

S102: The source base station sends the terminal status switching instruction to the terminal.

S103: The terminal receives the terminal status switching instruction sent by the source base station.

S104: The terminal instructs, according to the terminal status switching instruction, the plurality of SIM cards to switch the statuses between the SIM cards and the source base station to the connected state.

The SIM card binding information sent by the terminal to the source base station carries the information about the radio resource control statuses between the plurality of SIM cards and the source base station. After receiving the SIM card binding information sent by the terminal, the source base station may learn the information about the radio resource control statuses of the plurality of SIM cards, and generate the corresponding terminal status switching instruction based on the information about the radio resource control statuses of the plurality of SIM cards.

The terminal status switching instruction includes a first status switching instruction and/or a second status switching instruction. In this embodiment, the RRC_IDLE state is defined as a first state, and the RRC_INACTIVE state is defined as a second state.

Specifically, if some SIM cards in the terminal are in the RRC_IDLE state, the source base station generates the first status switching instruction for these SIM cards, to indicate the SIM cards in the RRC_IDLE state to connect to the source base station. If some SIM cards in the terminal are in the RRC_INACTIVE state, the source base station generates the second status switching instruction for these SIM cards, to indicate the SIM cards in the RRC_INACTIVE state to switch to the RRC_CONNECTED state. If some SIM cards in the terminal are in the RRC_IDLE state and some SIM cards are in the RRC_INACTIVE state, for the two parts of SIM cards, the source base station generates the first status switching instruction to indicate the SIM cards in the RRC_IDLE state to connect to the source base station, and generates the second status switching instruction to indicate the SIM cards in the RRC_INACTIVE state to switch to the RRC_CONNECTED state.

After receiving the first status switching instruction and/or the second status switching instruction sent by the source base station, the terminal may indicate a SIM card with a corresponding radio resource control status to switching the status. To be specific, the first status switching instruction is used to instruct a SIM card in the RRC_IDLE state in the terminal to switch from the RRC_IDLE state to the RRC_CONNECTED state by using an establish (Establish) function, and the second status switching instruction is used to instruct a SIM card in the RRC_INACTIVE state in the terminal to switch from the RRC_INACTIVE state to the RRC_CONNECTED state by using a release with suspend (Release with Suspend) function.

In an implementation, the source base station may immediately send the terminal status switching instruction after receiving the SIM card binding information sent by the terminal. In another implementation, the source base station may send the terminal status switching instruction at any moment before sending the radio resource control reconfiguration information to the terminal. In another implementation, the source base station may send the terminal status switching instruction at the same time when sending the radio resource control reconfiguration information to the terminal.

According to the method provided in this embodiment, it can be ensured that the plurality of SIM cards in the terminal remain in the RRC_CONNECTED state in the base station switching process, thereby ensuring effectiveness of the base station switching operation.

Embodiment (5)

According to the method in any one of Embodiments (1) to (4), when the terminal performs base station switching, that is, cell handover, there are two handover scenarios: intra-system handover (Intra-system Handover) and inter-system handover (Inter-system Handover). The intra-system handover does not involve a change of a type of a core network, but the inter-system handover involves a change of a type of a core network. Generally, the inter-system handover may include handover within a 5G core network, that is, intra 5GC (5G Core Network, 5G core network) handover: handover from a 5G core network to an EPC (Evolved Packet Core, long term evolution core), namely from 5GC to EPC, and handover from the EPC to the 5G core network, namely from EPC to 5GC.

To determine a handover scenario of the base station switching for the SIM cards, a type of a source core network connected to the SIM cards may be carried when the terminal sends the SIM card binding information to the source base station.

The target base station may determine, based on the type of the source core network connected to the SIM cards and a type of a core network provided by the target base station, the switching scenario of the SIM cards. If the type of the source core network is the same as the type of the target core network, the base station switching for the SIM cards is intra-system handover. In this case, core network handover is not required. If the type of the source core network is different from the type of the target core network, the base station switching for the SIM cards is inter-system handover. In this case, the core network handover needs to occur, and the radio resource control reconfiguration information sent by the target base station to the source base station needs to carry the type of the target core network, so that each SIM card in the terminal switches a core network type to the type of the target core network. In this way, the SIM cards can normally use a network.

Embodiment (6)

According to the method in any one of Embodiments (1) to (5), the SIM card binding information may include a binding relationship between the plurality of SIM cards.

Compared with the manner provided in Embodiment (1) in which the information about all the SIM cards is packaged and sent to the source base station by using one piece of binding signaling, and the plurality of SIM cards are considered as bound by default, this embodiment uses a binding relationship between the plurality of SIM cards. A specific representation, for example, a specific identifier or a description field, may be used to indicate that the plurality of SIM cards are bound, so as to reduce misjudgments of the source base station about whether the plurality of SIM cards are bound, or specific SIM cards that have a binding relationship.

Embodiment (7)

According to the method in Embodiment (6), 1/0 may be used to indicate whether the plurality of SIM cards are bound/not bound.

Specifically, when the SIM card binding information is represented by 1, it indicates that the plurality of SIM cards are bound; or when the SIM card binding information is represented by 0, it indicates that the plurality of SIM cards are not bound. In related processors of the terminal, the source base station, and the target base station, for example, a computer and a server, a binary operation is usually used. Correspondingly, using 1/0 to indicate whether the plurality of SIM cards are bound can facilitate an operation of binding signaling in the terminal, the source base station, and the target base station. It should be noted that if the plurality of SIM cards are not bound and the base station switching operation still needs to be performed, the binding relationship of the plurality of SIM cards needs to be re-established.

Embodiment (8)

According to the method in any one of Embodiments (1) to (7), the target base station sends the generated radio resource control reconfiguration information to the source base station in the form of a switching request response. The target base station may send the radio resource control reconfiguration information to the source base station at a time. The radio resource control reconfiguration information includes the SIM card binding information and the configuration parameters used by the plurality of SIM cards to connect to the target base station. Correspondingly, the source base station receives the radio resource control reconfiguration information sent by the target base station at a time, and sends the radio resource control reconfiguration information to the terminal. It can be learned from the process of generating the radio resource control reconfiguration information in Embodiment 1 that there is a mapping relationship between the information about the plurality of SIM cards and the configuration parameters used by the plurality of SIM cards to connect to the target base station. Therefore, there is also a mapping relationship between the SIM card binding information in the switching request response and the configuration parameter used by the plurality of SIM cards to connect to the target base station, and the mapping relationship can be used by the plurality of SIM cards in the terminal to accurately determine corresponding configuration parameters.

It can be learned from this embodiment that, the target base station can send the radio resource control reconfiguration information about the plurality of SIM cards by using only one switching request response, so that an amount of signaling sent by the target base station to the source base station and a time required for corresponding signaling transmission can be effectively reduced.

Embodiment (9)

According to the method in any one of Embodiments (1) to (7), the target base station sends the generated radio resource control reconfiguration information to the source base station in the form of a switching request response. The target base station may send the radio resource control reconfiguration information to the source base station at a plurality of times. In this case, the radio resource control reconfiguration information includes a plurality of pieces of sub-radio resource control reconfiguration information, each piece of sub-radio resource control reconfiguration information corresponds to one sending action of the target base station to the source base station, and each piece of sub-radio resource control reconfiguration information includes information about a single SIM card in the plurality of SIM cards and a configuration parameter used by the single SIM card to connect to the target base station. Correspondingly, the source base station receives the radio resource control reconfiguration information sent by the target base station at a plurality of times. The source base station receives one piece of sub-radio resource control reconfiguration information from the target base station each time.

It can be learned from the process of generating the radio resource control reconfiguration information in Embodiment (1) that, in sub-radio resource control reconfiguration information, there is also a mapping relationship between information about a single SIM card and a configuration parameter used for connecting the single SIM card to the target base station. Therefore, the terminal may accurately determine, by using the information about the single SIM card, the configuration parameter used by the single SIM card to connect to the target base station. Specifically, the target base station may send the sub-radio resource control reconfiguration information to the source base station in real time. That is, each time after correspondingly generating sub-radio resource control reconfiguration information of a single SIM card in the plurality of SIM cards based on the SIM card binding information, the target base station immediately sends the sub-radio resource control reconfiguration information to the source base station. Alternatively, the target base station may send the sub-radio resource control reconfiguration information to the source base station according to a preset sequence. That is, after generating the radio resource control reconfiguration information of the plurality of SIM cards based on the SIM card binding information, the target base station sequentially sends the sub-radio resource control reconfiguration information to the source base station according to a time sequence of generating the sub-radio resource control reconfiguration information of the single SIM cards in the plurality of SIM cards, or according to priorities of the single SIM cards in the plurality of SIM cards, for example, the primary card first and then the secondary cards.

It can be learned from this embodiment that the target base station may send the radio resource control reconfiguration information to the source base station at a plurality of times. In this case, when the target base station generates a configuration parameter for connecting a SIM card in the plurality of SIM cards to the target base station, the target base station may send the configuration parameter to the source base station in real time. This shortens waiting duration of the source base station, and improves timeliness of information transmission between the source base station and the target base station.

Embodiment (10)

According to the method in any one of Embodiments (1) to (9), after receiving the radio resource control reconfiguration information sent by the target base station, the source base station continues to send the radio resource control reconfiguration information to the terminal, so that the terminal connects to the target base station. Correspondingly, the terminal receives the radio resource control reconfiguration information sent by the source base station at a time, to switch the plurality of SIM cards to the target base station. The source base station may send the radio resource control reconfiguration information to the terminal at a time. In this case, the radio resource control reconfiguration information includes the SIM card binding information and the configuration parameters used by the plurality of SIM cards to connect to the target base station.

It can be learned from this embodiment that the source base station may send the radio resource control reconfiguration information of the plurality of SIM cards by using only one piece of signaling, so that an amount of signaling sent by the source base station to the terminal and a time required for transmitting the signaling can be effectively reduced.

Embodiment (11)

According to the method in any one of Embodiments (1) to (9), after receiving the radio resource control reconfiguration information sent by the target base station, the source base station continues to send the radio resource control reconfiguration information to the terminal, so that the terminal connects to the target base station. The source base station may send the radio resource control reconfiguration information to the terminal at a plurality of times. In this case, the radio resource control reconfiguration information includes a plurality of pieces of sub-radio resource control reconfiguration information, each piece of sub-radio resource control reconfiguration information corresponds to one sending action of the source base station to the terminal, and each piece of sub-radio resource control reconfiguration information includes information about a single SIM card in the plurality of SIM cards and a configuration parameter used by the single SIM card to connect to the target base station. Correspondingly, the terminal receives the radio resource control reconfiguration information sent by the source base station at a plurality of times. The terminal receives one piece of sub-radio resource control reconfiguration information from the source base station each time.

It can be learned from the process of generating the radio resource control reconfiguration information in Embodiment (1) that, in sub-radio resource control reconfiguration information, there is also a mapping relationship between information about a single SIM card and a configuration parameter used for connecting the single SIM card to the target base station. Therefore, the terminal may accurately determine, by using the information about the single SIM card, the configuration parameter used by the single SIM card to connect to the target base station. Specifically, the source base station may send the sub-radio resource control reconfiguration information to the terminal in real time. That is, if the target base station sends the radio resource control reconfiguration information to the source base station in a manner of sending the radio resource control reconfiguration information at a plurality of times, the source base station may immediately send the sub-radio resource control reconfiguration information to the terminal each time receiving one piece of sub-radio resource control reconfiguration information. The source base station may alternatively send the sub-radio resource control reconfiguration information to the terminal according to a preset sequence. That is, after receiving the radio resource control reconfiguration information sent by the target base station, the source base station sequentially sends the sub-radio resource control reconfiguration information to the terminal according to a time sequence of receiving the sub-radio resource control reconfiguration information, or according to priorities of the single SIM cards in the plurality of SIM cards, for example, the primary card first and then the secondary cards.

It can be learned from this embodiment that the source base station may send the radio resource control reconfiguration information to the terminal at a plurality of times. In this case, after obtaining the configuration parameters for connecting the plurality of SIM cards to the target base station, the source base station may send the sub-radio resource control reconfiguration information to the terminal, to improve accuracy of correspondence between a configuration parameter and a single SIM card, thereby ensuring quality of information transmission between the source base station and the terminal.

Embodiment (12)

According to the method in any one of Embodiments (1) to (11), after receiving the radio resource control reconfiguration information sent by the source base station, the terminal completes a switching action based on the radio resource control reconfiguration information.

S601: The terminal indicates, based on the information about the plurality of SIM cards, the plurality of SIM cards to correspondingly obtain the configuration parameters used by the plurality of SIM cards to connect to the target base station.

S602: The terminal indicates the plurality of SIM cards to switch from being connected to the source base station to being connected to the target base station based on the configuration parameters used by the plurality of SIM cards to connect to the target base station.

Each SIM card in the terminal corresponds to a different configuration parameter. Only when a corresponding configuration parameter is selected, the SIM card can be successfully connected to the target base station, and various services provided by the target base station can be normally used. The information about the plurality of SIM cards may be used to distinguish the SIM cards. Therefore, the terminal may accurately obtain, based on the information about the plurality of SIM cards, a configuration parameter that is for connecting to the target base station and that corresponds to each SIM card, to indicate each SIM card to switch to the target base station by using the corresponding configuration parameter.

It can be learned from this embodiment that the terminal can accurately obtain, in a manner of correspondingly obtaining data, the configuration parameters respectively corresponding to the plurality of SIM cards, thereby effectively ensuring SIM card switching quality.

Embodiment (13)

According to the method in any one of Embodiments (1) to (12), the terminal sends the radio resource control reconfiguration complete information to the target base station after all the SIM cards complete the base station switching operation. The terminal may send the radio resource control reconfiguration complete information to the target base station at a time. In this case, the radio resource control reconfiguration complete information includes the SIM card binding information. Correspondingly, the target base station receives the radio resource control reconfiguration complete information sent by the terminal at a time, so as to end this switching operation.

It can be learned from this embodiment that the terminal can send the radio resource control reconfiguration complete information of the plurality of SIM cards by using only one piece of signaling, so that an amount of signaling sent by the terminal to the target base station and a time required for transmitting the signaling can be effectively reduced.

Embodiment (14)

According to the method in any one of Embodiments (1) to (12), the terminal sends the radio resource control reconfiguration complete information to the target base station after all the SIM cards complete the base station switching operation. The terminal may send the radio resource control reconfiguration complete information to the target base station at a plurality of times. In this case, the radio resource control reconfiguration complete information includes a plurality of pieces of sub-radio resource control reconfiguration complete information, and each piece of sub-radio resource control reconfiguration complete information corresponds to one sending action of the terminal to the target base station. Each piece of sub-radio resource control reconfiguration complete information includes information about a single SIM card in the plurality of SIM cards that completes the switching operation. Correspondingly, the target base station receives the radio resource control reconfiguration complete information sent by the terminal at a plurality of times. The target base station receives one piece of sub-radio resource control reconfiguration complete information from the terminal each time.

Specifically, the terminal may send the sub-radio resource control reconfiguration complete information to the target base station in real time, that is, each time a SIM card in the terminal completes the switching operation, the terminal immediately sends sub-radio resource control reconfiguration complete information corresponding to the SIM card to the target base station. Alternatively, the terminal may send the sub-radio resource control reconfiguration complete information to the target base station according to a preset sequence. To be specific, after the plurality of SIM cards in the terminal complete the switching operation, the terminal sequentially sends the sub-radio resource control reconfiguration complete information to the target base station according to a time sequence of completing the switching operation by the plurality of SIM cards, or according to priorities of the single SIM cards in the plurality of SIM cards, for example, the primary card first and then the secondary cards.

It can be learned from this embodiment that the terminal can send the radio resource control reconfiguration complete information to the target base station at a plurality of times. In this case, the terminal may send the radio resource control reconfiguration complete information of the SIM cards to the target base station in real time, to enable the target base station to end switching monitoring on the SIM cards, thereby reducing resource occupation of the target base station.

Embodiment (15)

According to the method in any one of Embodiments (1) to (14), the target base station does not allow access of the terminal in some cases. Before generating the radio resource control reconfiguration information, the target base station needs to first obtain a current quantity of connected SIM cards. If the current quantity of connected SIM cards is greater than a preset SIM card quantity threshold, it indicates that the target base station cannot continue to connect to a SIM card, and the target base station needs to send a switching prohibition response to the source base station, to enable the source base station to notify the terminal to end the switching operation. In this way, a problem that effective switching cannot be performed due to a connection limit set by the target base station can be effectively resolved, so as to ensure switching effectiveness of the terminal, and avoid a resource waste caused because the terminal still attempts to perform switching when the terminal cannot perform switching due to the connection limit set by the target base station. In addition, this ensures connection quality of SIM cards in the target base station, and avoids a case in which a SIM card cannot normally use a network after being forcibly connected to the target base station, or normal use of a network by a SIM card of another terminal connected to the target base station is affected.

Optionally, if the terminal cannot access the target base station due to a case such as a fault of the target base station, the target base station also needs to send the switching prohibition request to the source base station. If the target base station sends the switching prohibition request to the source base station, the terminal needs to stop a current base station switching operation, and re-determine a target base station that can be accessed to perform the base station switching operation.

The following embodiments may be used to describe instruction transmission in the base station switching method provided in Embodiments (1) to (15).

Embodiment (16)

Figure 7:
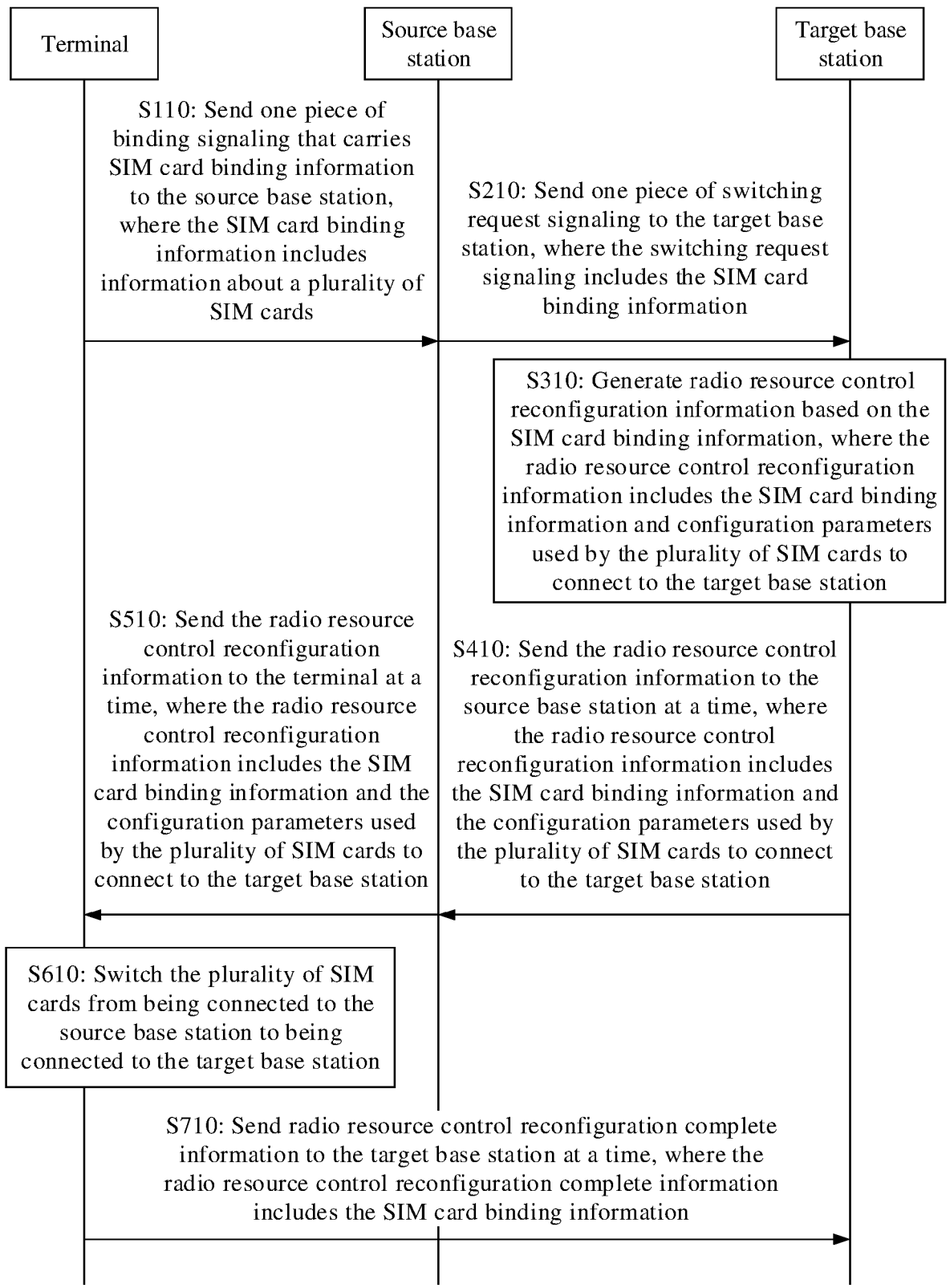
FIG. 7 is a schematic flowchart of a first type of base station switching.

FIG. 7 shows a schematic flowchart of a first type of base station switching. The following describes this embodiment with reference to FIG. 7.

S110: A terminal sends one piece of binding signaling that carries SIM card binding information to a source base station, where the SIM card binding information includes information about a plurality of SIM cards.

S210: The source base station sends one piece of switching request signaling to a target base station, where the switching request signaling includes the SIM card binding information.

S310: The target base station generates radio resource control reconfiguration information based on the SIM card binding information, where the radio resource control reconfiguration information includes the SIM card binding information and configuration parameters used by the plurality of SIM cards to connect to the target base station.

S410: The target base station sends the radio resource control reconfiguration information to the source base station at a time, where the radio resource control reconfiguration information includes the SIM card binding information and the configuration parameters used by the plurality of SIM cards to connect to the target base station.

S510: The source base station sends the radio resource control reconfiguration information to the terminal at a time, where the radio resource control reconfiguration information includes the SIM card binding information and the configuration parameters used by the plurality of SIM cards to connect to the target base station.

S610: The terminal switches the plurality of SIM cards from being connected to the source base station to being connected to the target base station.

S710: The terminal sends radio resource control reconfiguration complete information to the target base station at a time, where the radio resource control reconfiguration complete information includes the SIM card binding information.

The terminal 1 shown in FIG. 1 and FIG. 2 is used as an example. The terminal 1 has the first SIM card 5 and the second SIM card 6, and the terminal 1 is handed over from the source base station (the base station A) to the target base station (the base station B). First, the terminal 1 needs to send SIM card binding information, that is, information about the first SIM card 5 and the second SIM card 6, to the base station A. The information about the first SIM card 5 and the second SIM card 6 may be SIM card identification information described in Embodiment 1. Details are not described herein again.

In addition, the SIM card binding information may further include a binding relationship between the first SIM card 5 and the second SIM card 6, and the binding relationship may be represented by 1/0.

To ensure effectiveness of a switching operation of the first SIM card 5 and the second SIM card 6 and effectiveness of using a network after the switching, the information about the first SIM card 5 and the second SIM card 6 includes information about a radio resource control status between the first SIM card 5 and the base station A and a radio resource control status between the second SIM card 6 and the base station A, and a type of a source core network.

After receiving the SIM card binding information sent by the terminal, the base station A sends one piece of switching request signaling to the base station B. The switching request signaling may include the SIM card binding information of the first SIM card 5 and the second SIM card 6.

The base station B generates radio resource control reconfiguration information based on the SIM card binding information of the first SIM card 5 and the second SIM card 6. The radio resource control reconfiguration information includes the SIM card binding information of the first SIM card 5 and the second SIM card 6, a configuration parameter used to connect the first SIM card 5 to the base station B, and a configuration parameter used to connect the second SIM card 6 to the base station B. The base station B sends the radio resource control reconfiguration information to the base station A at a time. The radio resource control reconfiguration information includes the SIM card binding information of the first SIM card 5 and the second SIM card 6, configuration information used to connect the first SIM card 5 to the base station B, and configuration information used to connect the second SIM card 6 to the base station B. The radio resource control reconfiguration information further includes a type of a target core network, and is used by the first SIM card 5 and the second SIM card 6 to switch a core network type.

After receiving the radio resource control reconfiguration information sent by the base station B, the base station A sends the radio resource control reconfiguration information to the terminal 1 at a time. In this case, the radio resource control reconfiguration information includes the SIM card binding information of the first SIM card 5 and the second SIM card 6, the configuration parameter used to connect the first SIM card 5 to the base station B, and the configuration parameter used to connect the second SIM card 6 to the base station B. The terminal 1 determines corresponding configuration parameters based on the binding information of the first SIM card 5 and the second SIM card 6, and a mapping relationship between the binding information of the first SIM card 5 and the second SIM card 6 and the configuration parameters used for connecting to the base station B. Specifically, the first SIM card 5 switches to the base station B by using the configuration parameter used for connecting the first SIM card 5 to the base station B, and the second SIM card 6 switches to the base station B by using the configuration parameter used for connecting the second SIM card 6 to the base station B.

After the switching operation performed by the first SIM card 5 and the second SIM card 6 is completed, the terminal 1 sends radio resource control reconfiguration complete information to the base station B at a time. The radio resource control reconfiguration complete information includes the SIM card binding information of the first SIM card 5 and the second SIM card 6. In this case, this base station switching operation is completed.

It can be learned that, in this embodiment, in a process in which the plurality of SIM cards in the terminal switch between base stations, because the plurality of SIM cards have binding information, instructions for the plurality of SIM cards may be transferred by using one piece of signaling. Therefore, instead of sending one piece of signaling for each SIM card, the source base station sends only one piece of signaling to the target base station, the target base station sends only one piece of signaling to the source base station, the source base station sends only one piece of signaling to the terminal, and the terminal sends only one piece of signaling to the target base station. This effectively reduces an amount of signaling generated in a base station switching process. Correspondingly, air interface occupation can also be reduced, and total duration required for signaling transmission can be reduced, thereby improving switching efficiency of the terminal having a plurality of SIM cards during base station switching.

Embodiment (17)

Figure 8A:
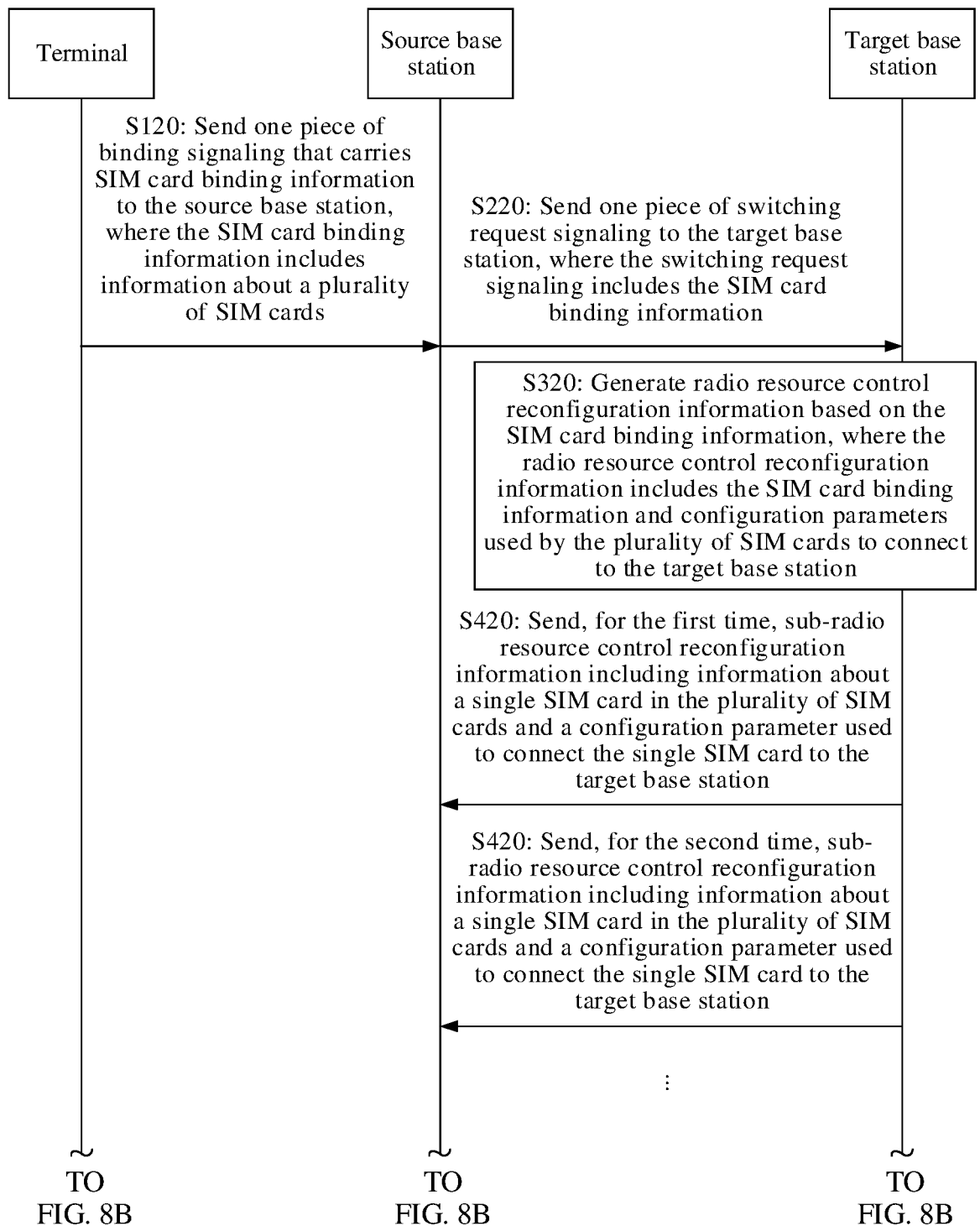
FIG. 8A and FIG. 8B are a schematic flowchart of a second type of base station switching.
Figure 8B:
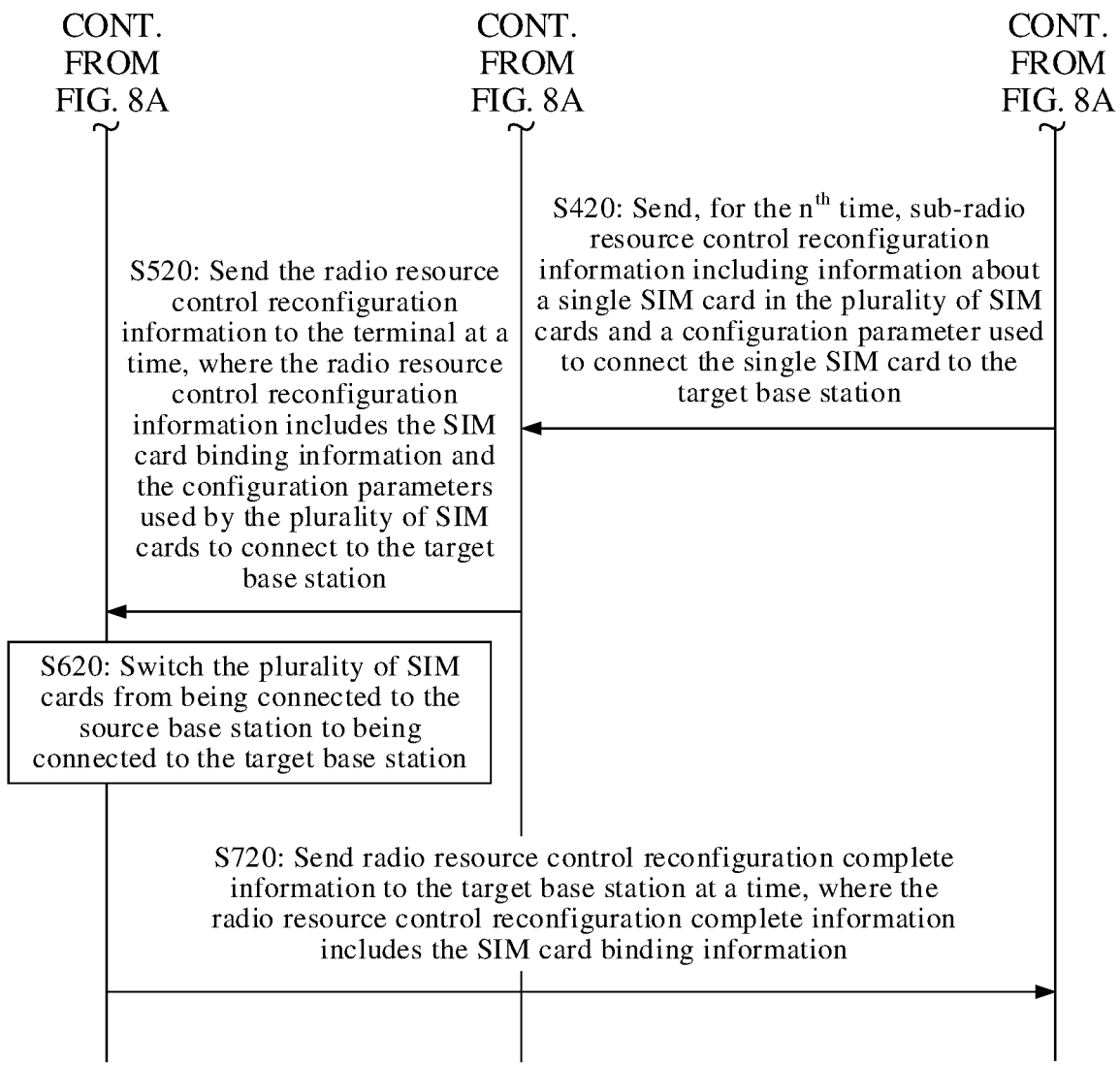

On the basis of Embodiment (16), FIG. 8A and FIG. 8B show a schematic flowchart of a second type of base station switching. The following describes differences from Embodiment (16) with reference to FIG. 8A and FIG. 8B.

S120: A terminal sends one piece of binding signaling that carries SIM card binding information to a source base station, where the SIM card binding information includes information about a plurality of SIM cards.

S220: The source base station sends one piece of switching request signaling to a target base station, where the switching request signaling includes the SIM card binding information.

S320: The target base station generates radio resource control reconfiguration information based on the SIM card binding information, where the radio resource control reconfiguration information includes the SIM card binding information and configuration parameters used by the plurality of SIM cards to connect to the target base station.

S420: The target base station sends the radio resource control reconfiguration information to the source base station at a plurality of times, where the radio resource control reconfiguration information includes a plurality of pieces of sub-radio resource control reconfiguration information, and the sub-radio resource control reconfiguration information includes information about a single SIM card in the plurality of SIM cards and a configuration parameter used by the single SIM card to connect to the target base station.

S520: The source base station sends the radio resource control reconfiguration information to the terminal at a time, where the radio resource control reconfiguration information includes the SIM card binding information and the configuration parameters used by the plurality of SIM cards to connect to the target base station.

S620: The terminal switches the plurality of SIM cards from being connected to the source base station to being connected to the target base station.

S720: The terminal sends radio resource control reconfiguration complete information to the target base station at a time, where the radio resource control reconfiguration complete information includes the SIM card binding information.

Different from Embodiment (16), in this embodiment, in step S420, the base station B sends the radio resource control reconfiguration information to the base station A at a plurality of times. In this case, the radio resource control reconfiguration information includes first sub-radio resource control reconfiguration information and second sub-radio resource control reconfiguration information, and the two pieces of sub-radio resource control reconfiguration information each correspond to one sending action of the base station B to the base station A. The first sub-radio resource control reconfiguration information includes the information about the first SIM card 5 and the configuration parameter used for connecting the first SIM card 5 to the base station B, and the second sub-radio resource control reconfiguration information includes the information about the second SIM card 6 and the configuration parameter used for connecting the second SIM card 6 to the base station B.

It can be learned that, in this embodiment, in a process in which the plurality of SIM cards in the terminal switch between base stations, the target base station sends the radio resource control reconfiguration information to the source base station at a plurality of times. In this case, when the target base station generates a configuration parameter for connecting a SIM card in the plurality of SIM cards to the target base station, the target base station may send the configuration parameter to the source base station in real time. This shortens waiting duration of the source base station, and improves timeliness of information transmission between the source base station and the target base station. However, the source base station still sends only one piece of signaling to the target base station, the source base station still sends only one piece of signaling to the terminal, and the terminal still sends only one piece of signaling to the target base station. Compared with a manner in which one piece of signaling is sent for each SIM card between any two ends, the method in this embodiment can still effectively reduce an amount of signaling generated in the base station switching process. Correspondingly, air interface occupation can also be reduced, and total duration required for signaling transmission can be reduced, thereby improving switching efficiency of the terminal having a plurality of SIM cards during base station switching.

Embodiment (18)

Figure 9A:
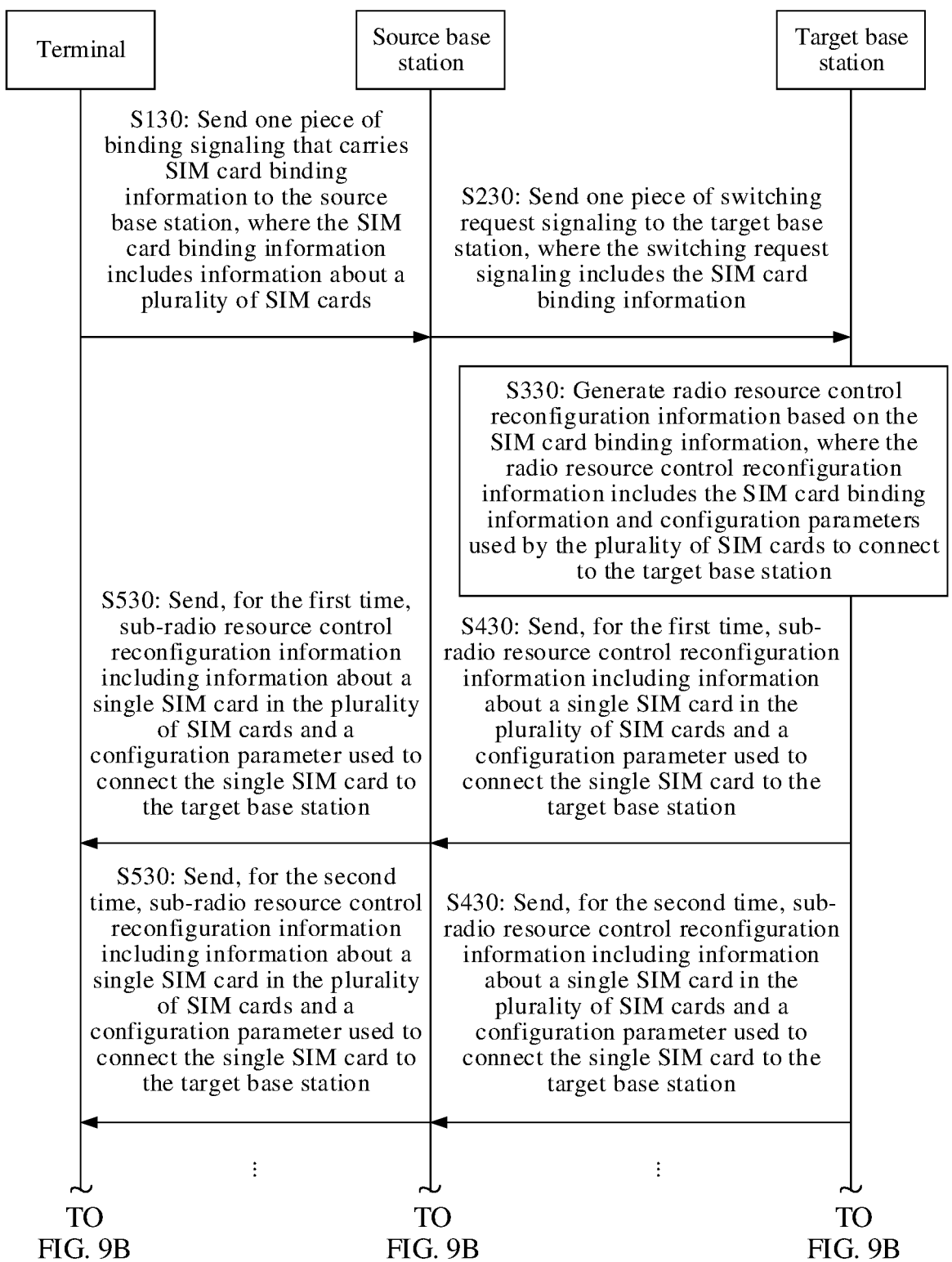
FIG. 9A and FIG. 9B are a schematic flowchart of a third type of base station switching.
Figure 9B:
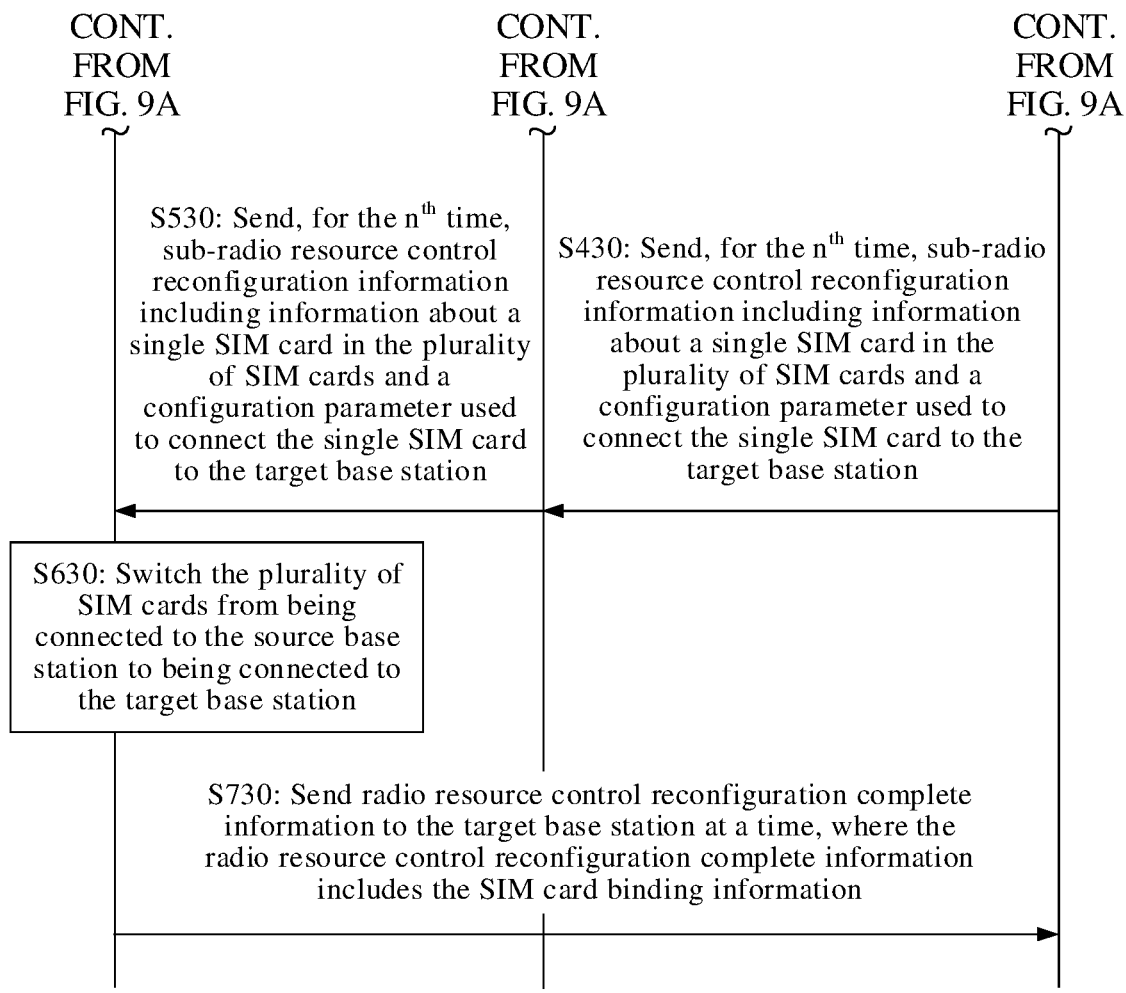

On the basis of Embodiment (16), FIG. 9A and FIG. 9B show a schematic flowchart of a third type of base station switching. The following describes differences from Embodiment (16) with reference to FIG. 9A and FIG. 9B.

S130: A terminal sends one piece of binding signaling that carries SIM card binding information to a source base station, where the SIM card binding information includes information about a plurality of SIM cards.

S230: The source base station sends one piece of switching request signaling to a target base station, where the switching request signaling includes the SIM card binding information.

S330: The target base station generates radio resource control reconfiguration information based on the SIM card binding information, where the radio resource control reconfiguration information includes the SIM card binding information and configuration parameters used by the plurality of SIM cards to connect to the target base station.

S430: The target base station sends the radio resource control reconfiguration information to the source base station at a plurality of times, where the radio resource control reconfiguration information includes a plurality of pieces of sub-radio resource control reconfiguration information, and the sub-radio resource control reconfiguration information includes information about a single SIM card in the plurality of SIM cards and a configuration parameter used by the single SIM card to connect to the target base station.

S530: The source base station sends the radio resource control reconfiguration information to the terminal at a plurality of times, where the radio resource control reconfiguration information includes a plurality of pieces of sub-radio resource control reconfiguration information, and the sub-radio resource control reconfiguration information includes information about a single SIM card in the plurality of SIM cards and a configuration parameter used by the single SIM card to connect to the target base station.

S630: The terminal switches the plurality of SIM cards from being connected to the source base station to being connected to the target base station.

S730: The terminal sends radio resource control reconfiguration complete information to the target base station at a time, where the radio resource control reconfiguration complete information includes the SIM card binding information.

Different from Embodiment (16), in this embodiment, in step S430, the base station B sends the radio resource control reconfiguration information to the base station A at plurality of times. This process is the same as step S420 in Embodiment (17), and is not described herein again.

Different from Embodiment (16), in this embodiment, in step S530, after receiving the radio resource control reconfiguration information sent by the base station B, the base station A sends the radio resource control reconfiguration information to the terminal 1 at a plurality of times. In this case, the radio resource control reconfiguration information includes first sub-radio resource control reconfiguration information and second sub-radio resource control reconfiguration information, and the two pieces of sub-radio resource control reconfiguration information each correspond to one sending action of the base station A to the terminal 1. The first sub-radio resource control reconfiguration information includes the information about the first SIM card 5 and the configuration parameter used for connecting the first SIM card 5 to the base station B, and the second sub-radio resource control reconfiguration information includes the information about the second SIM card 6 and the configuration parameter used for connecting the second SIM card 6 to the base station B.

It can be learned that, in this embodiment, in a process in which the plurality of SIM cards in the terminal switch between base stations, the target base station sends the radio resource control reconfiguration information to the source base station at a plurality of times. In this case, when the target base station generates a configuration parameter for connecting a SIM card in the plurality of SIM cards to the target base station, the target base station may send the configuration parameter to the source base station in real time. This shortens waiting duration of the source base station, and improves timeliness of information transmission between the source base station and the target base station.

In addition, the source base station sends the radio resource control reconfiguration information to the terminal at a plurality of times. In this case, after obtaining the configuration parameters for connecting the plurality of SIM cards to the target base station, the source base station may send the sub-radio resource control reconfiguration information to the terminal, to improve accuracy of correspondence between a configuration parameter and a single SIM card, thereby ensuring quality of information transmission between the source base station and the terminal.

However, the source base station still sends only one piece of signaling to the target base station, and the terminal still sends only one piece of signaling to the target base station. Compared with a manner in which one piece of signaling is sent for each SIM card between any two ends, the method in this embodiment can still effectively reduce an amount of signaling generated in the base station switching process. Correspondingly, air interface occupation can also be reduced, and total duration required for signaling transmission can be reduced, thereby improving switching efficiency of the terminal having a plurality of SIM cards during base station switching.

Embodiment (19)

Figure 10A:
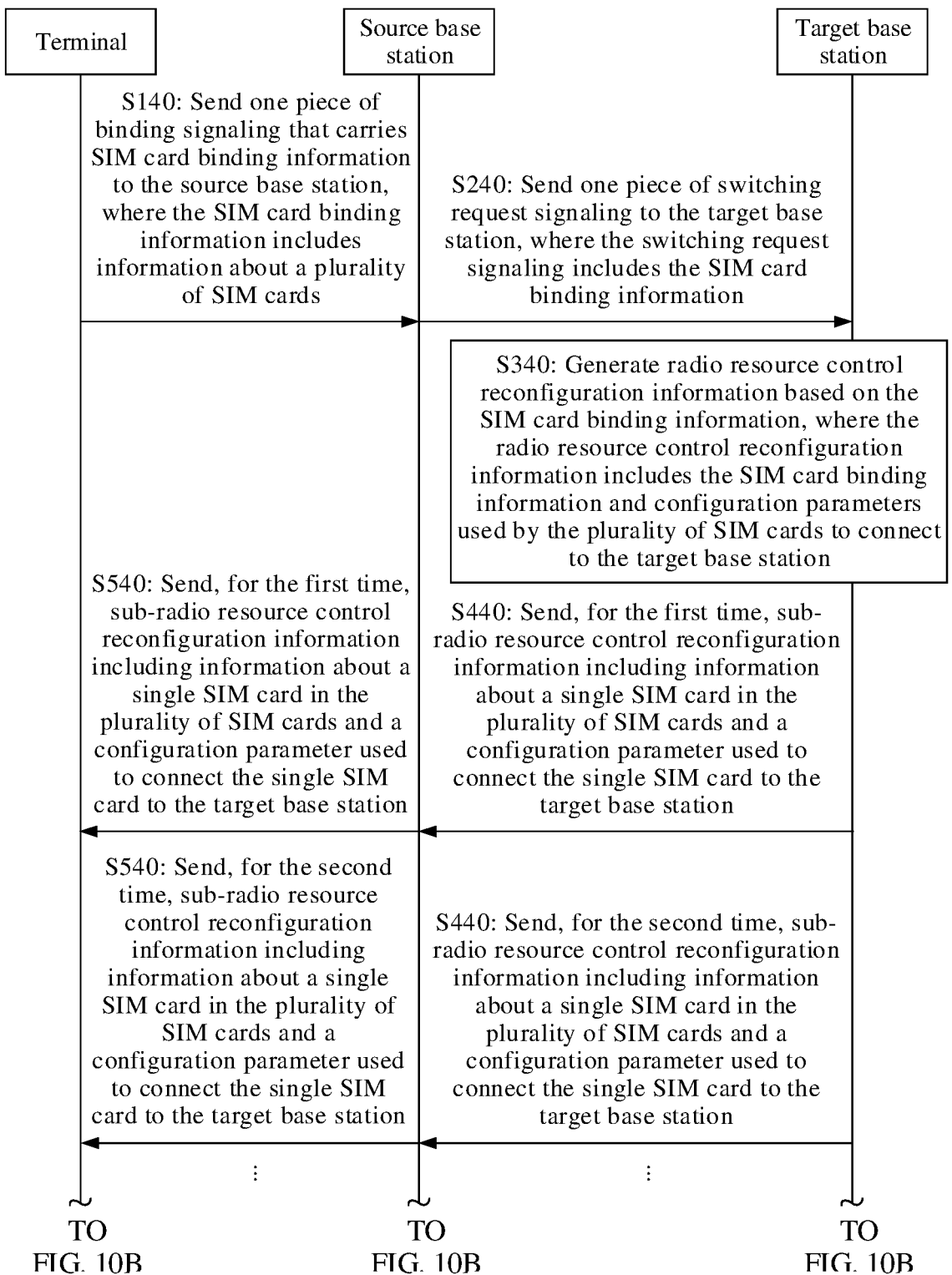
FIG. 10A and FIG. 10B are a schematic flowchart of a fourth type of base station switching.
Figure 10B:
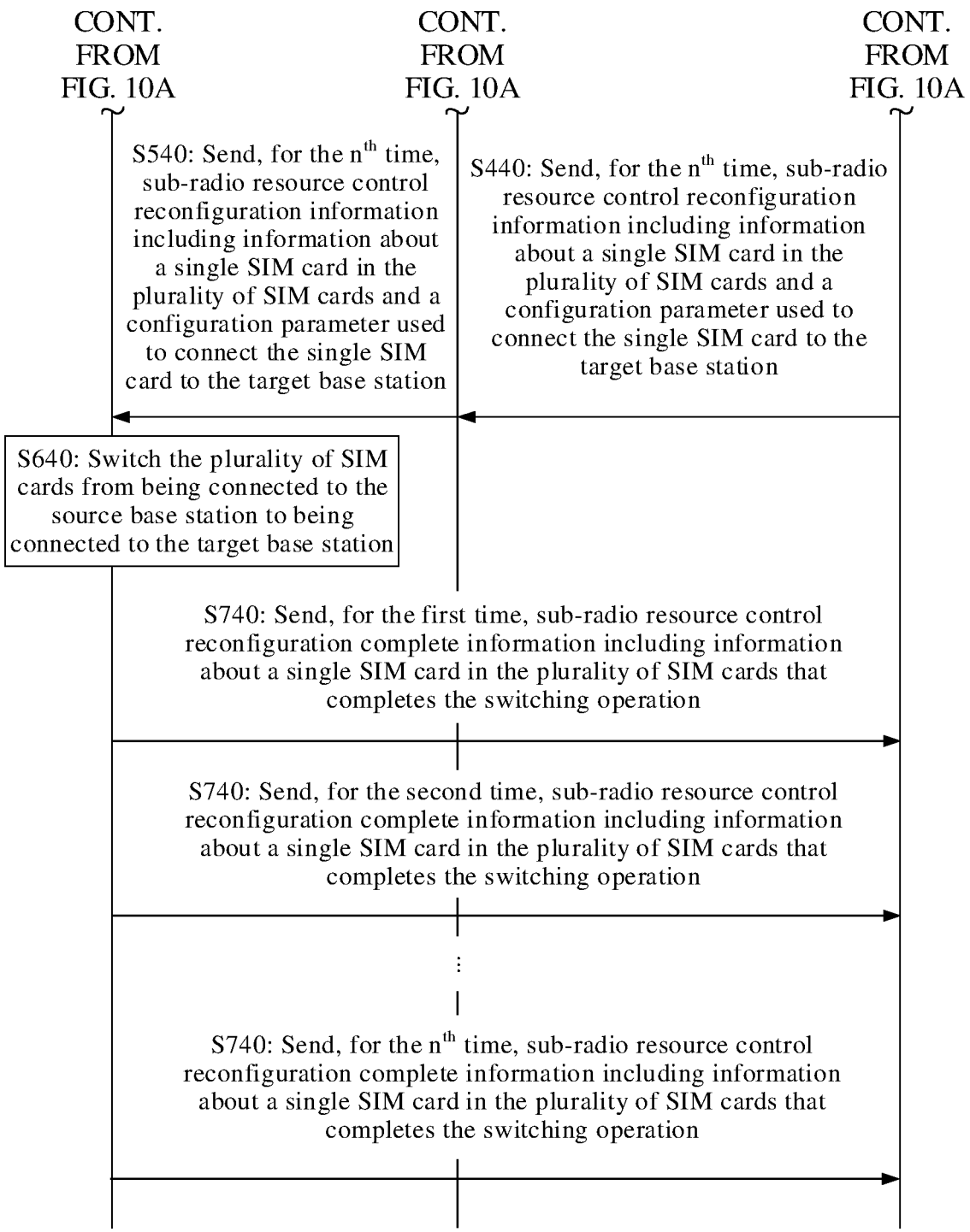

On the basis of Embodiment (16), FIG. 10A and FIG. 10B show a schematic flowchart of a fourth type of base station switching. The following describes differences from Embodiment (16) with reference to FIG. 10A and FIG. 10B.

S140: A terminal sends one piece of binding signaling that carries SIM card binding information to a source base station, where the SIM card binding information includes information about a plurality of SIM cards.

S240: The source base station sends one piece of switching request signaling to a target base station, where the switching request signaling includes the SIM card binding information.

S340: The target base station generates radio resource control reconfiguration information based on the SIM card binding information, where the radio resource control reconfiguration information includes the SIM card binding information and configuration parameters used by the plurality of SIM cards to connect to the target base station.

S440: The target base station sends the radio resource control reconfiguration information to the source base station at a plurality of times, where the radio resource control reconfiguration information includes a plurality of pieces of sub-radio resource control reconfiguration information, and the sub-radio resource control reconfiguration information includes information about a single SIM card in the plurality of SIM cards and a configuration parameter used by the single SIM card to connect to the target base station.

S540: The source base station sends the radio resource control reconfiguration information to the terminal at a plurality of times, where the radio resource control reconfiguration information includes a plurality of pieces of sub-radio resource control reconfiguration information, and the sub-radio resource control reconfiguration information includes information about a single SIM card in the plurality of SIM cards and a configuration parameter used by the single SIM card to connect to the target base station.

S640: The terminal switches the plurality of SIM cards from being connected to the source base station to being connected to the target base station.

S740: The terminal sends the radio resource control reconfiguration complete information to the target base station at a plurality of times, where the radio resource control reconfiguration complete information includes a plurality of pieces of sub-radio resource control reconfiguration complete information, and the sub-radio resource control reconfiguration complete information includes information about a single SIM card in the plurality of SIM cards that completes the switching operation.

Different from Embodiment (16), in this embodiment, in step S440, the base station B sends the radio resource control reconfiguration information to the base station A at plurality of times. This process is the same as step S420 in Embodiment (17), and is not described herein again.

Different from Embodiment (16), in this embodiment, in step S540, after receiving the radio resource control reconfiguration information sent by the base station B, the base station A sends the radio resource control reconfiguration information to the terminal 1 at a plurality of times. This process is the same as step S530 in Embodiment (18), and is not described herein again.

Different from Embodiment (16), in this embodiment, in step S640, after the first SIM card 5 and/or the second SIM card 6 complete/completes the base station switching operation, the terminal 1 sends the radio resource control reconfiguration complete information to the base station B at a plurality of times. The radio resource control reconfiguration complete information includes first sub-radio resource control reconfiguration complete information and second sub-radio resource control reconfiguration complete information, and each piece of sub-radio resource control reconfiguration complete information corresponds to an action of sending by the terminal 1 to the base station B. The first sub-radio resource control reconfiguration complete information includes the information about the first SIM card 5, and the second sub-radio resource control reconfiguration complete information includes the information about the second SIM card 6.

It can be learned that, in this embodiment, in a process in which the plurality of SIM cards in the terminal switch between base stations, the target base station sends the radio resource control reconfiguration information to the source base station at a plurality of times. In this case, when the target base station generates a configuration parameter for connecting a SIM card in the plurality of SIM cards to the target base station, the target base station may send the configuration parameter to the source base station in real time. This shortens waiting duration of the source base station, and improves timeliness of information transmission between the source base station and the target base station.

In addition, the source base station sends the radio resource control reconfiguration information to the terminal at a plurality of times. In this case, after obtaining the configuration parameters for connecting the plurality of SIM cards to the target base station, the source base station may send the sub-radio resource control reconfiguration information to the terminal, to improve accuracy of correspondence between a configuration parameter and a single SIM card, thereby ensuring quality of information transmission between the source base station and the terminal.

In addition, the terminal sends the radio resource control reconfiguration complete information to the target base station at a plurality of times. In this case, the terminal may send the radio resource control reconfiguration complete information of the SIM cards to the target base station in real time, to enable the target base station to end switching monitoring on the SIM cards, thereby reducing resource occupation of the target base station.

However, the source base station still sends only one piece of signaling to the target base station. Compared with a manner in which one piece of signaling is sent for each SIM card between any two ends, the method in this embodiment can still effectively reduce an amount of signaling generated in the base station switching process. Correspondingly, air interface occupation can also be reduced, and total duration required for signaling transmission can be reduced, thereby improving switching efficiency of the terminal having a plurality of SIM cards during base station switching.

Embodiment (20)

Figure 11A:
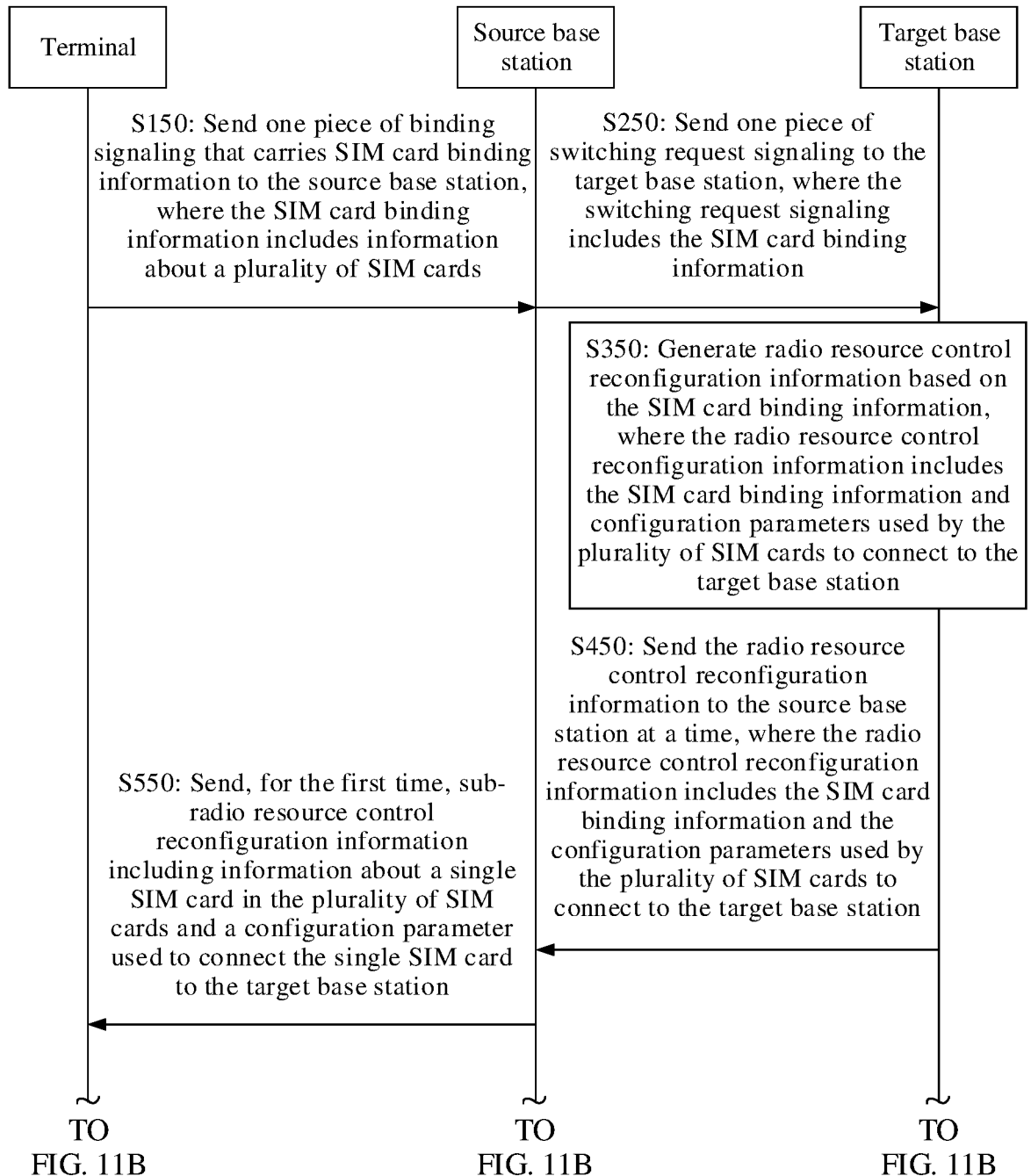
FIG. 11A and FIG. 11B are a schematic flowchart of a fifth type of base station switching.
Figure 11B:
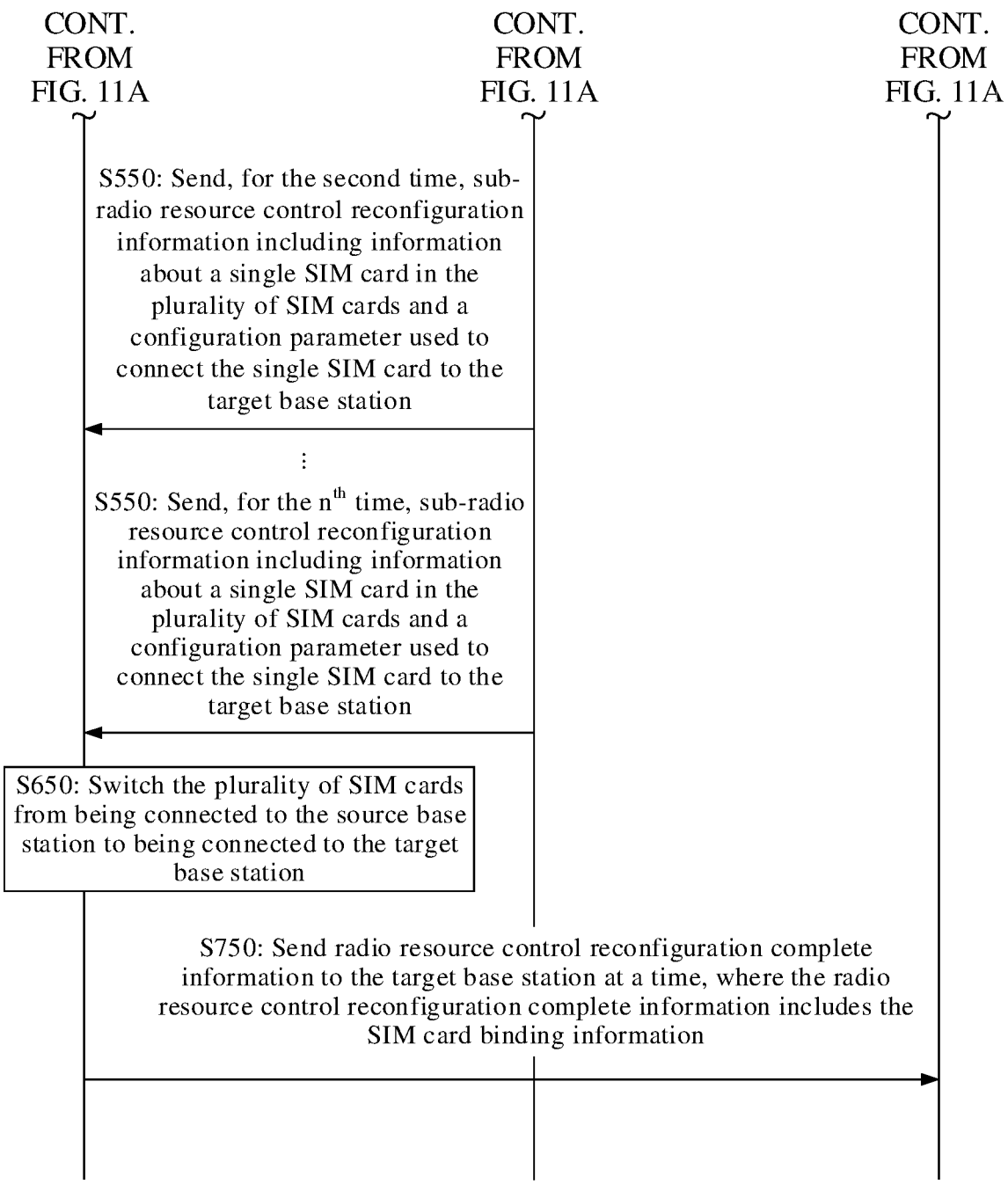

On the basis of Embodiment (16), FIG. 11A and FIG. 11B show a schematic flowchart of a fifth type of base station switching. The following describes differences from Embodiment (16) with reference to FIG. 11A and FIG. 11B.

S150: A terminal sends one piece of binding signaling that carries SIM card binding information to a source base station, where the SIM card binding information includes information about a plurality of SIM cards.

S250: The source base station sends one piece of switching request signaling to a target base station, where the switching request signaling includes the SIM card binding information.

S350: The target base station generates radio resource control reconfiguration information based on the SIM card binding information, where the radio resource control reconfiguration information includes the SIM card binding information and configuration parameters used by the plurality of SIM cards to connect to the target base station.

S450: The target base station sends the radio resource control reconfiguration information to the source base station at a time, where the radio resource control reconfiguration information includes the SIM card binding information and the configuration parameters used by the plurality of SIM cards to connect to the target base station.

S550: The source base station sends the radio resource control reconfiguration information to the terminal at a plurality of times, where the radio resource control reconfiguration information includes a plurality of pieces of sub-radio resource control reconfiguration information, and the sub-radio resource control reconfiguration information includes information about a single SIM card in the plurality of SIM cards and a configuration parameter used by the single SIM card to connect to the target base station.

S650: The terminal switches the plurality of SIM cards from being connected to the source base station to being connected to the target base station.

S750: The terminal sends radio resource control reconfiguration complete information to the target base station at a time, where the radio resource control reconfiguration complete information includes the SIM card binding information.

Different from Embodiment (16), in this embodiment, in step S550, after receiving the radio resource control reconfiguration information sent by the base station B, the base station A sends the radio resource control reconfiguration information to the terminal 1 at a plurality of times. This process is the same as step S530 in Embodiment (18), and details are not described herein again.

It can be learned that, in this embodiment, in a process in which the plurality of SIM cards in the terminal switch between base stations, the source base station sends the radio resource control reconfiguration information to the terminal at a plurality of times. In this case, after obtaining the configuration parameters for connecting the plurality of SIM cards to the target base station, the source base station may send the sub-radio resource control reconfiguration information to the terminal, to improve accuracy of correspondence between a configuration parameter and a single SIM card, thereby ensuring quality of information transmission between the source base station and the terminal.

In addition, the source base station sends only one piece of signaling to the target base station, the target base station sends only one piece of signaling to the source base station, and the terminal sends only one piece of signaling to the target base station. This can effectively reduce an amount of signaling generated in the base station switching process, and improve switching efficiency when the terminal having a plurality of SIM cards switches between base stations.

Embodiment (21)

Figure 12A:
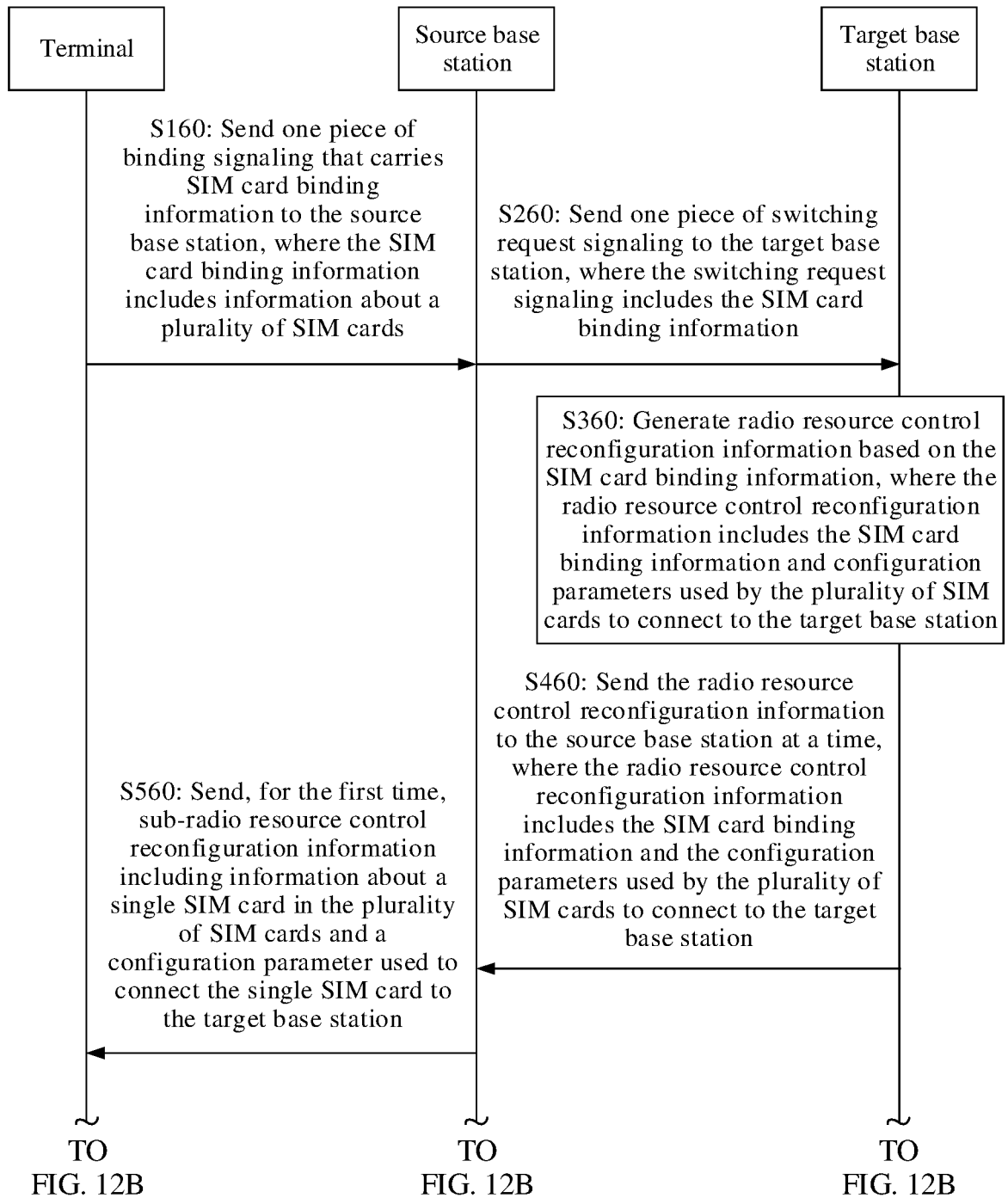
FIG. 12A and FIG. 12B are a schematic flowchart of a sixth type of base station switching.
Figure 12B:
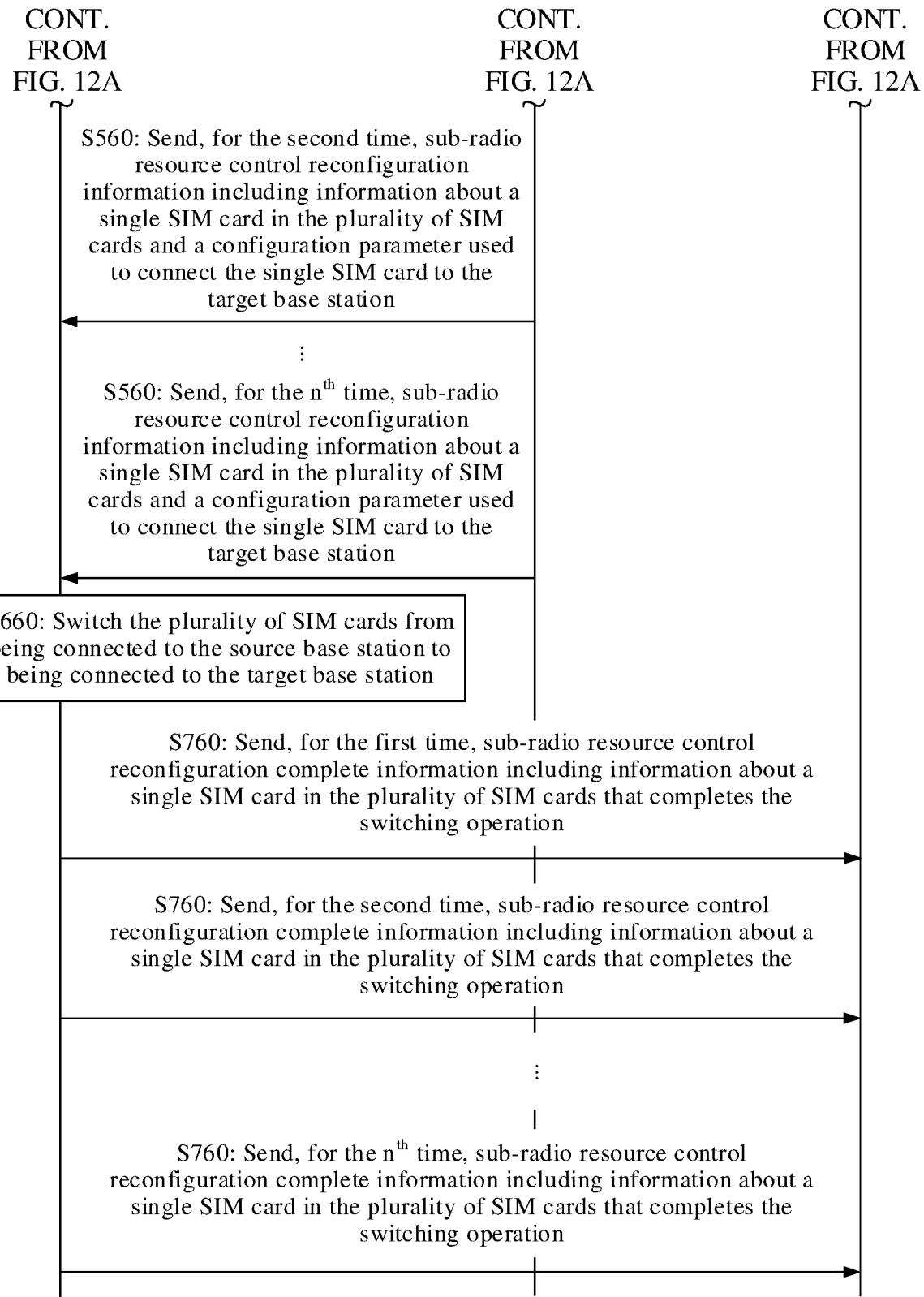

On the basis of Embodiment (16), FIG. 12A and FIG. 12B show a schematic flowchart of a sixth type of base station switching. The following describes differences from Embodiment (16) with reference to FIG. 12A and FIG. 12B.

S160: A terminal sends one piece of binding signaling that carries SIM card binding information to a source base station, where the SIM card binding information includes information about a plurality of SIM cards.

S260: The source base station sends one piece of switching request signaling to a target base station, where the switching request signaling includes the SIM card binding information.

S360: The target base station generates radio resource control reconfiguration information based on the SIM card binding information, where the radio resource control reconfiguration information includes the SIM card binding information and configuration parameters used by the plurality of SIM cards to connect to the target base station.

S460: The target base station sends the radio resource control reconfiguration information to the source base station at a time, where the radio resource control reconfiguration information includes the SIM card binding information and the configuration parameters used by the plurality of SIM cards to connect to the target base station.

S560: The source base station sends the radio resource control reconfiguration information to the terminal at a plurality of times, where the radio resource control reconfiguration information includes a plurality of pieces of sub-radio resource control reconfiguration information, and the sub-radio resource control reconfiguration information includes information about a single SIM card in the plurality of SIM cards and a configuration parameter used by the single SIM card to connect to the target base station.

S660: The terminal switches the plurality of SIM cards from being connected to the source base station to being connected to the target base station.

S760: The terminal sends the radio resource control reconfiguration complete information to the target base station at a plurality of times, where the radio resource control reconfiguration complete information includes a plurality of pieces of sub-radio resource control reconfiguration complete information, and the sub-radio resource control reconfiguration complete information includes information about a single SIM card in the plurality of SIM cards that completes the switching operation.

Different from Embodiment (16), in this embodiment, in step S560, after receiving the radio resource control reconfiguration information sent by the base station B, the base station A sends the radio resource control reconfiguration information to the terminal 1 at a plurality of times. This process is the same as step S530 in Embodiment (18), and details are not described herein again.

Different from Embodiment (16), in this embodiment, in step S760, after the first SIM card 5 and/or the second SIM card 6 complete/completes the base station switching operation, the terminal 1 sends the radio resource control reconfiguration complete information to the base station B at a plurality of times. This process is the same as step S740 in Embodiment (19), and details are not described herein again.

It can be learned that, in this embodiment, the source base station sends the radio resource control reconfiguration information to the terminal at a plurality of times. In this case, after obtaining the configuration parameters for connecting the plurality of SIM cards to the target base station, the source base station may send the sub-radio resource control reconfiguration information to the terminal, to improve accuracy of correspondence between a configuration parameter and a single SIM card, thereby ensuring quality of information transmission between the source base station and the terminal.

In addition, the terminal sends the radio resource control reconfiguration complete information to the target base station at a plurality of times. In this case, the terminal may send the radio resource control reconfiguration complete information of the SIM cards to the target base station in real time, to enable the target base station to end switching monitoring on the SIM cards, thereby reducing resource occupation of the target base station.

In addition, the source base station sends only one piece of signaling to the target base station, and the target base station sends only one piece of signaling to the source base station. This can effectively reduce an amount of signaling generated in the base station switching process, and improve switching efficiency when the terminal having a plurality of SIM cards switches between base stations.

Embodiment (22)

Figure 13A:
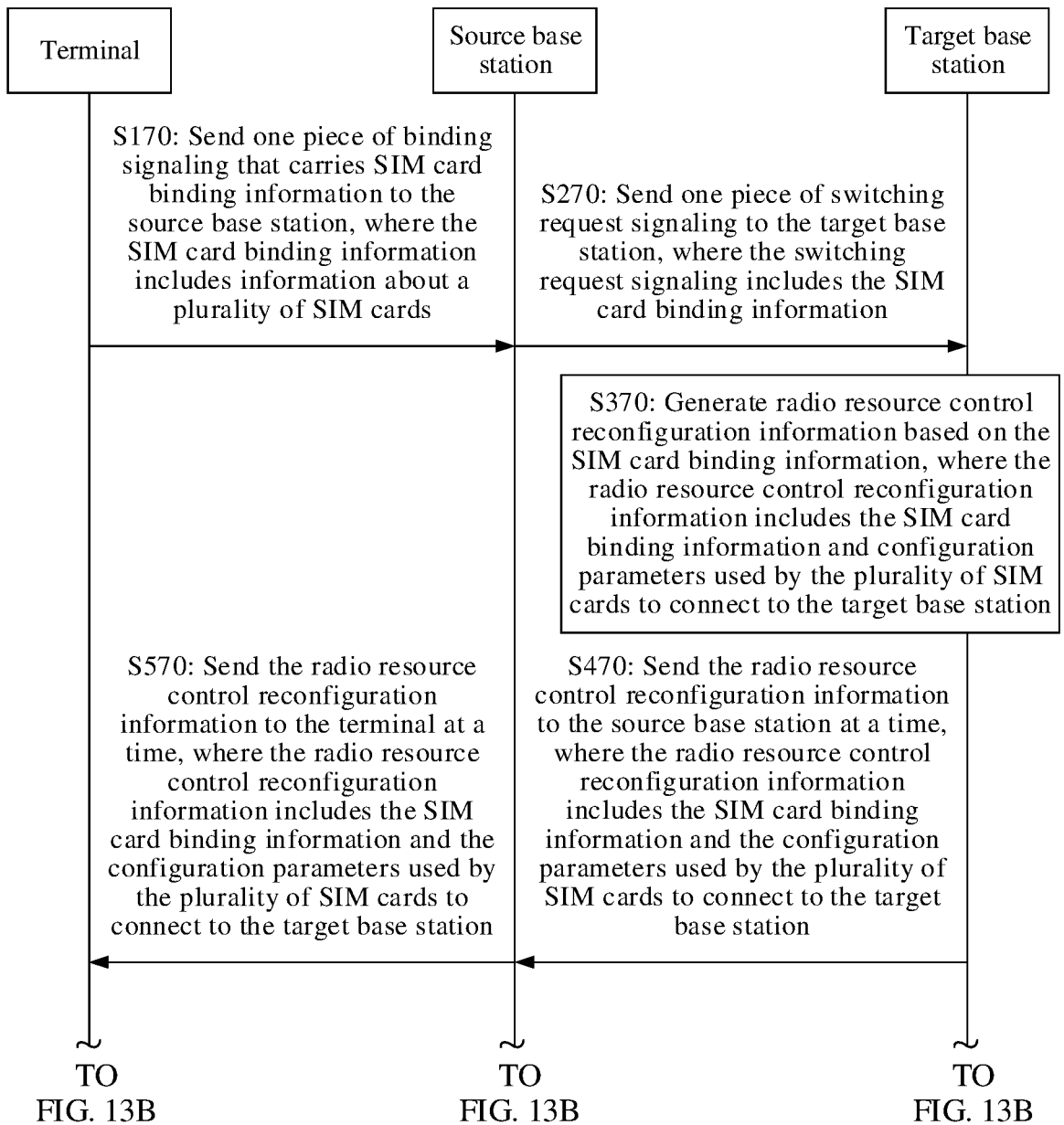
FIG. 13A and FIG. 13B are a schematic flowchart of a seventh type of base station switching.
Figure 13B:
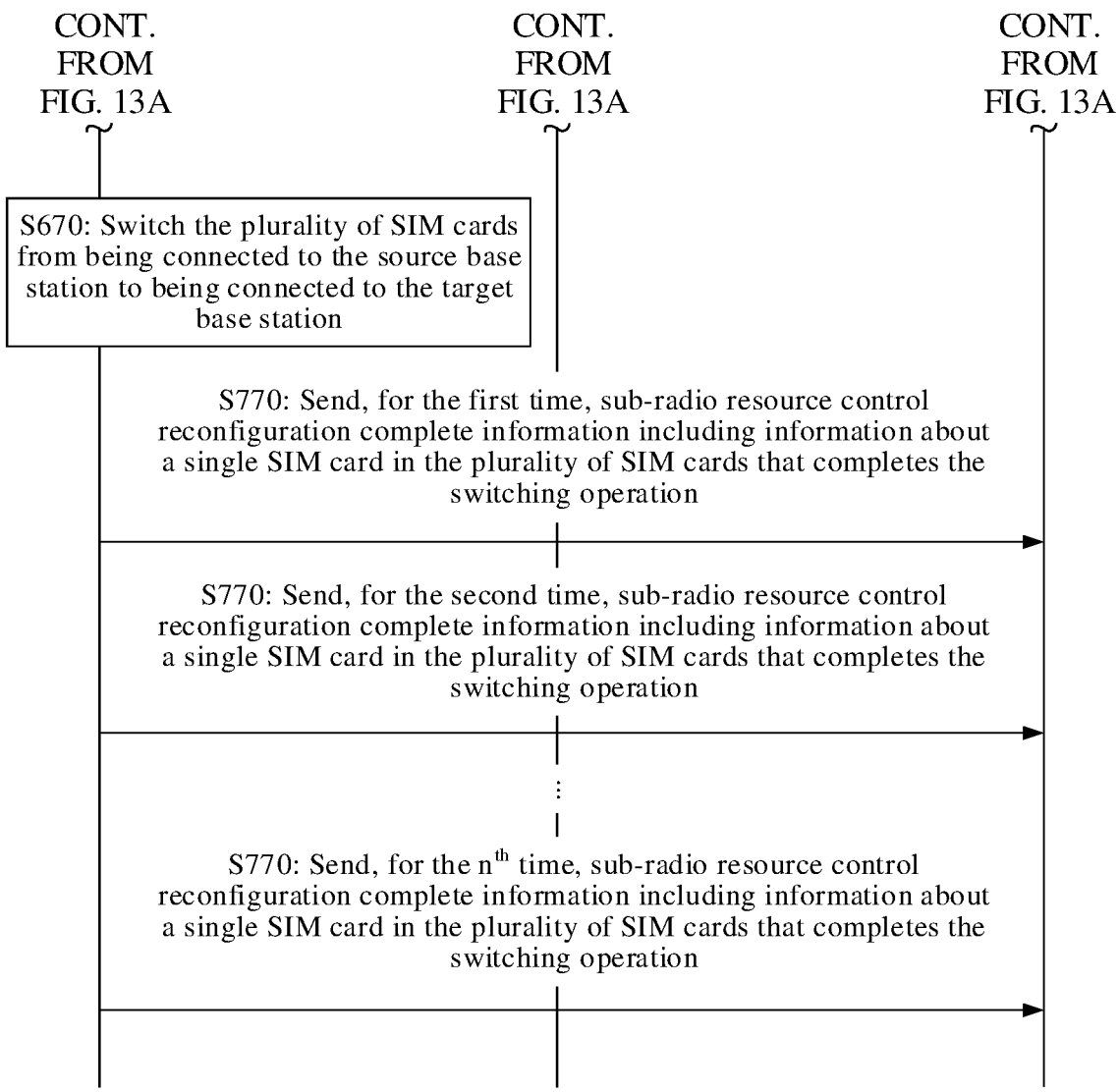

On the basis of Embodiment (16), FIG. 13A and FIG. 13B show a schematic flowchart of a seventh type of base station switching. The following describes differences from Embodiment (16) with reference to FIG. 13A and FIG. 13B.

S170: A terminal sends one piece of binding signaling that carries SIM card binding information to a source base station, where the SIM card binding information includes information about a plurality of SIM cards.

S270: The source base station sends one piece of switching request signaling to a target base station, where the switching request signaling includes the SIM card binding information.

S370: The target base station generates radio resource control reconfiguration information based on the SIM card binding information, where the radio resource control reconfiguration information includes the SIM card binding information and configuration parameters used by the plurality of SIM cards to connect to the target base station.

S470: The target base station sends the radio resource control reconfiguration information to the source base station at a time, where the radio resource control reconfiguration information includes the SIM card binding information and the configuration parameters used by the plurality of SIM cards to connect to the target base station.

S570: The source base station sends the radio resource control reconfiguration information to the terminal at a time, where the radio resource control reconfiguration information includes the SIM card binding information and the configuration parameters used by the plurality of SIM cards to connect to the target base station.

S670: The terminal switches the plurality of SIM cards from being connected to the source base station to being connected to the target base station.

S770: The terminal sends the radio resource control reconfiguration complete information to the target base station at a plurality of times, where the radio resource control reconfiguration complete information includes a plurality of pieces of sub-radio resource control reconfiguration complete information, and the sub-radio resource control reconfiguration complete information includes information about a single SIM card in the plurality of SIM cards that completes the switching operation.

Different from Embodiment (16), in this embodiment, in step S770, after the first SIM card 5 and/or the second SIM card 6 complete/completes the base station switching operation, the terminal 1 sends the radio resource control reconfiguration complete information to the base station B at a plurality of times. This process is the same as step S740 in Embodiment (19), and details are not described herein again.

In the foregoing embodiments provided in this application, the solutions of the base station switching method provided in this application are described from a perspective of interaction between the terminal having the plurality of SIM cards, the source base station, and the target base station. It may be understood that, to implement the foregoing functions, each base station switching apparatus includes a corresponding hardware structure and/or software module for performing each function. A person skilled in the art should be easily aware that, with reference to units and algorithm steps in the examples described in the embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

To implement the foregoing base station switching method, the embodiments of this application further provide base station switching apparatuses corresponding to the terminal having a plurality of SIM cards, the source base station, and the target base station.

Figure 14:
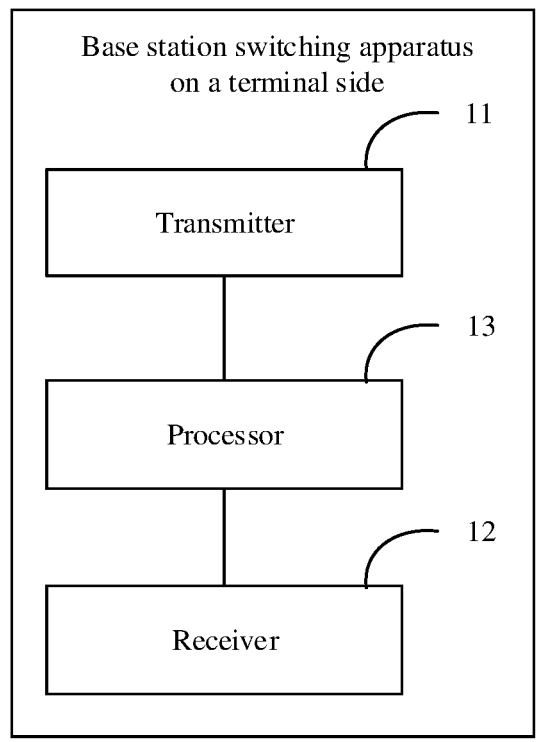
FIG. 14 is a schematic diagram of a structure of a base station switching apparatus of a terminal having a plurality of SIM cards.

FIG. 14 is a schematic diagram of a structure of a base station switching apparatus of a terminal having a plurality of SIM cards. As shown in FIG. 14, the base station switching apparatus includes a transmitter 11, a receiver 12, and a processor 13.

Figure 15:
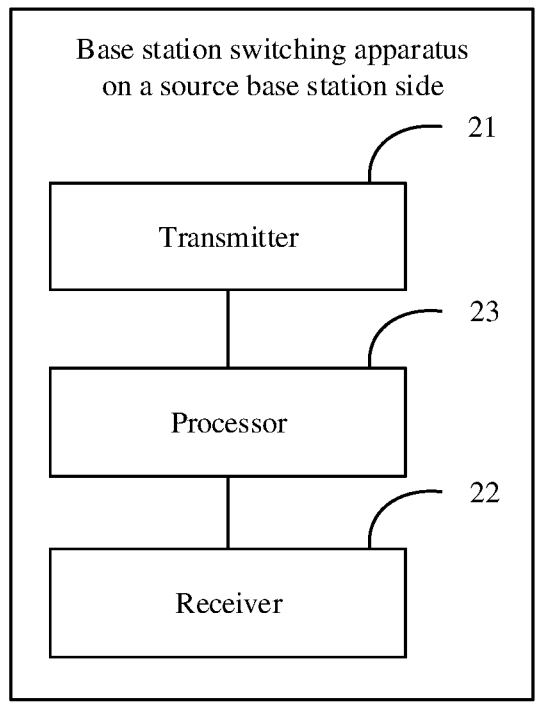
FIG. 15 is a schematic diagram of a structure of a base station switching apparatus of a source base station.

FIG. 15 is a schematic diagram of a structure of a base station switching apparatus of a source base station. As shown in FIG. 15, the base station switching apparatus includes a transmitter 21, a receiver 22, and a processor 23.

Figure 16:
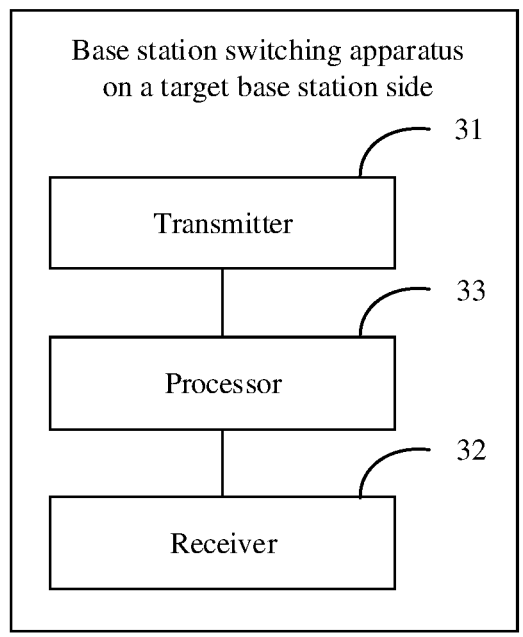
FIG. 16 is a schematic diagram of a structure of a base station switching apparatus of a target base station.

FIG. 16 is a schematic diagram of a structure of a base station switching apparatus of a target base station. As shown in FIG. 16, the base station switching apparatus includes a transmitter 31, a receiver 32, and a processor 33.

Figure 17:
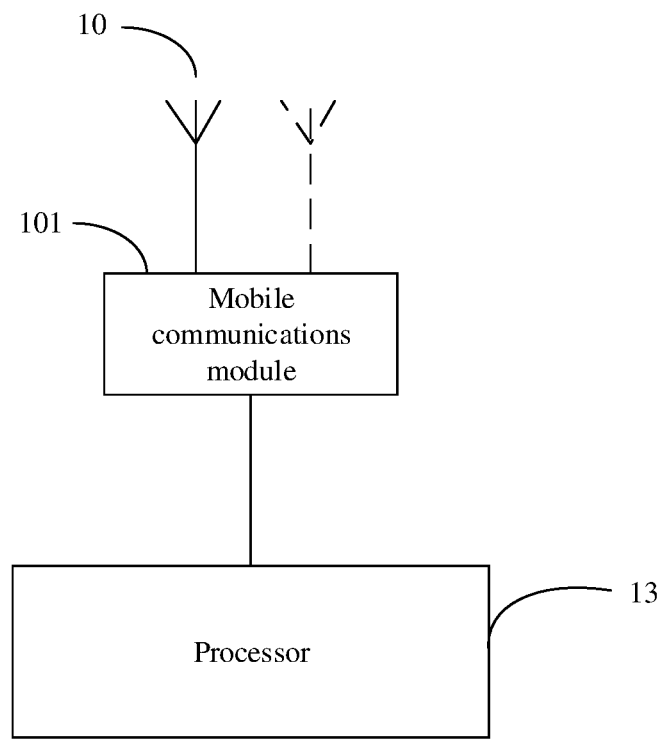
FIG. 17 is a schematic diagram of a structure of a transmitter and a receiver.

FIG. 17 is a schematic diagram of a structure of a transmitter and a receiver. The transmitter 11 and the receiver 12 may be formed by connecting a same antenna 10 and a mobile communications module 101. The antenna 10 is connected to the mobile communications module 101, and the antenna 10 is configured to transmit and receive electromagnetic wave signals. A plurality of transmitters 11 and receivers 12, that is, a plurality of antennas, may be disposed on a same terminal, and each antenna may be configured to cover one or more communications frequency bands. Different antennas may be further multiplexed, to increase antenna utilization.

The mobile communications module 101 may provide a wireless communication solution including 2G/3G/4G/5G and the like that is applied to a terminal having a plurality of SIM cards. The mobile communications module 101 may include at least one filter, a switch, a power amplifier, a low noise amplifier (low noise amplifier, LNA), and the like. The mobile communications module 101 may receive an electromagnetic wave through the antenna 10, perform processing such as filtering and amplification on the received electromagnetic wave, and transmit a processed electromagnetic wave to the modem processor for demodulation. The mobile communications module 101 may further amplify a signal modulated by the modem processor, and convert the signal into an electromagnetic wave for radiation through the antenna 10. In some embodiments, at least some function modules of the mobile communications module 101 may be disposed in the processor 13. In some embodiments, at least some function modules of the mobile communications module 101 and at least some modules of the processor 13 may be disposed in a same device.

The processor 23 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/ or the like. Different processing units may be independent components, or may be integrated into one or more processors.

The memory in the embodiments of this application may include at least one of the following types: a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM). In some scenarios, the memory may alternatively be a compact disc read-only memory (compact disc read-only memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can carry or store expected program code in a form of instructions or a data structure and that can be accessed by a computer. However, the memory is not limited thereto. The controller may generate an operation control signal based on instruction operation code and a time sequence signal, to complete control of instruction reading and instruction execution.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits an obtained signal to the application processor. The application processor outputs a sound signal by using an audio device (which is not limited to a speaker 170A, a receiver 170B, or the like), or displays an image or a video on a display 194. In some embodiments, the modem processor may be an independent component. In some other embodiments, the modem processor may be independent of the processor 110, and is disposed in a same device as the mobile communications module 150 or another function module.

A memory may be further disposed in the processor 23, and is configured to store an instruction and data. In some embodiments, the memory in the processor 23 is a cache. The memory may store an instruction or data that has just been used or has been repeatedly used by the processor 23. If the processor 23 needs to reuse the instruction or the data, the processor 23 may directly invoke the instruction or the data from the memory. This avoids repeated access and reduces a waiting time of the processor 23, thereby improving system efficiency.

Specifically, the transmitter 11 sends one piece of binding signaling that carries SIM card binding information to a source base station, where the SIM card binding information includes information about a plurality of SIM cards in the terminal.

After the receiver 22 receives the binding signaling sent by the transmitter 11, the processor 23 processes the signal to generate one piece of switching request signaling. The switching request signaling includes the SIM card binding information. The transmitter 21 sends the switching request signaling to a target base station. The processor 23 may be a signal processor that has a modulation/demodulation function and a logical operation function.

After the receiver 32 receives the switching request signaling sent by the transmitter 21, the processor 33 demodulates an electrical signal of the switching request signaling, and then generates radio resource control reconfiguration information based on the SIM card binding information in the switching request signaling by using an information processing method such as a logical operation. The radio resource control reconfiguration information includes the SIM card binding information and configuration parameters used to connect the plurality of SIM cards to the target base station. After the radio resource control reconfiguration information is re-modulated into an electrical signal, the electrical signal is sent to the source base station through the transmitter 31.

The processor 33 may pack the generated radio resource control reconfiguration information as a whole, and send the radio resource control reconfiguration information to the source base station through the transmitter 31 at a time. In this case, the radio resource control reconfiguration information includes the SIM card binding information and the configuration parameters used to connect the plurality of SIM cards to the target base station. Alternatively, the processor 33 may pack the generated radio resource control reconfiguration information into a plurality of pieces of sub-radio resource control reconfiguration information. The sub-radio resource control reconfiguration information includes information about a single SIM card in the plurality of SIM cards and a configuration parameter used to connect the single SIM card to the target base station. The plurality of pieces of sub-radio resource control reconfiguration information are sent to the source base station through the transmitter 31 at a plurality of times, and the transmitter 31 sends one piece of sub-radio resource control reconfiguration information each time.

After the receiver 22 receives the radio resource control reconfiguration information sent by the transmitter 31, the processor 23 demodulates an electrical signal of the radio resource control reconfiguration information, and then regenerates the radio resource control reconfiguration information by using an information processing method such as a logical operation.

The processor 23 may modulate the received radio resource control reconfiguration information that is in a whole form into an electrical signal that is suitable for transmission between the source base station and the terminal, and the transmitter 21 sends the electrical signal to the terminal. The processor 23 may alternatively modulate, still in a form of the sub radio resource control reconfiguration information after demodulating the sub-radio resource control reconfiguration information received at a plurality of times, the sub-radio resource control reconfiguration information into electrical signals suitable for transmission between the source base station and the terminal, and the transmitter 21 sequentially sends the electrical signals to the terminal according to a preset sending sequence. Alternatively, after demodulating the received radio resource control reconfiguration information in a whole form, the processor 23 may split the radio resource control reconfiguration information in the whole form into a plurality of pieces of sub-radio resource control reconfiguration information by using an information processing method such as a logical operation. The sub-radio resource control reconfiguration information includes information about a single SIM card in the plurality of SIM cards and a configuration parameter for connecting the single SIM card to the target base station. Then the processor 23 modulates the sub-radio resource control reconfiguration information into electrical signals suitable for transmission between the source base station and the terminal, and the transmitter 21 sequentially sends the electrical signals to the terminal according to a preset sending sequence. After demodulating the sub-radio resource control reconfiguration information received at a plurality of times, the processor 23 may alternatively pack the sub-radio resource control reconfiguration information into a whole piece of radio resource control reconfiguration information, and modulate the radio resource control reconfiguration information into an electrical signal suitable for transmission between the source base station and the terminal, and the transmitter 21 sends the electrical signal to the terminal.

After the receiver 12 receives the radio resource control reconfiguration information sent by the transmitter 21, the processor 13 demodulates the radio resource control reconfiguration information, and switches the plurality of SIM cards from being connected to the source base station to being connected to the target base station.

The processor 13 generates radio resource control reconfiguration complete information after the plurality of SIM cards complete the switching operation. Specifically, the processor 13 may pack the radio resource control reconfiguration complete information as a whole, and the transmitter 11 sends the radio resource control reconfiguration complete information to the target base station at a time. In this case, the radio resource control reconfiguration complete information includes the SIM card binding information. Alternatively, the processor 13 may pack the radio resource control reconfiguration complete information into a plurality of pieces of sub-radio resource control reconfiguration complete information. The sub-radio resource control reconfiguration complete information includes information about a single SIM card in the plurality of SIM cards that completes the switching operation. The transmitter 11 sends the radio resource control reconfiguration complete information to the target base station at a plurality of times. The transmitter 11 sends one piece of sub-radio resource control reconfiguration complete information each time.

After the receiver 32 receives the radio resource control reconfiguration complete information sent by the transmitter 11, the processor 33 demodulates the radio resource control reconfiguration complete information and determines that this base station switching operation is completed.

To ensure that each SIM card in the terminal is in an RRC_CONNECTED state, the binding signaling sent by the terminal to the source base station needs to carry RRC statuses of the plurality of SIM cards. To be specific, the information about the plurality of SIM cards in the SIM card binding information includes information about radio resource control statuses between the plurality of SIM cards and the source base station.

In this case, after the receiver 22 receives the binding signaling that carries the SIM card binding information and that is sent by the transmitter 11, the processor 23 demodulates the binding signaling, and generates a terminal status switching instruction based on the information about the radio resource control statuses between the plurality of SIM cards and the source base station. Specifically, if some SIM cards are in an RRC_IDLE state, the processor 23 generates a first status switching instruction for these SIM cards, to indicate the SIM cards in the RRC_IDLE state to connect to the source base station. If some SIM cards are in an RRC_INACTIVE state, the processor 23 generates a second status switching instruction for these SIM cards, to indicate the SIM cards in the RRC_INACTIVE state to switch to the RRC_CONNECTED state. If some SIM cards in the terminal are in the RRC_IDLE state and some SIM cards are in the RRC_INACTIVE state, for the two parts of SIM cards, the processor 23 generates the first status switching instruction to indicate the SIM cards in the RRC_IDLE state to connect to the source base station, and generates the second status switching instruction to indicate the SIM cards in the RRC_INACTIVE state to switch to the RRC_CONNECTED state. The first status switching instruction and/or the second status switching instruction are/is modulated into an electrical signal that is suitable for transmission between the source base station and the terminal, and the transmitter 21 sends the first status switching instruction and/or the second status switching instruction to the terminal.

In an implementation, after generating the terminal status switching instruction, the processor 23 may immediately indicate the transmitter 21 to send the terminal status switching instruction. In another implementation, the processor 23 may indicate the transmitter 21 to send the terminal status switching instruction at any moment before the radio resource control reconfiguration information is sent. In another implementation, the processor 23 may indicate the transmitter 21 to send the terminal status switching instruction and the radio resource control reconfiguration information at the same time.

After the receiver 12 receives the first status switching instruction and/or the second status switching instruction sent by the transmitter 21, the processor 13 demodulates the first status switching instruction and/or the second status switching instruction, and indicates a SIM card in a corresponding radio resource control status to switch the status. To be specific, the first status switching instruction is used to instruct a SIM card in the RRC_IDLE state in the terminal to switch from the RRC_IDLE state to the RRC_CONNECTED state by using an establish (Establish) function, and the second status switching instruction is used to instruct a SIM card in the RRC_INACTIVE state in the terminal to switch from the RRC_INACTIVE state to the RRC_CONNECTED state by using a release with suspend (Release with Suspend) function.

It should be noted that the target base station does not allow a terminal to access the target base station in some cases. If a current quantity of connected SIM cards of the target base station is greater than a preset SIM card quantity threshold, the target base station cannot bear access of more SIM cards, or the target base station is faulty, and the terminal cannot access the target base station. The processor 33 generates a switching prohibition request, and the transmitter 31 sends the switching prohibition request to the source base station.

It can be learned from this embodiment that, the plurality of SIM cards in the terminal may be bound, so that at least an amount of signaling between the source base station and the target base station and an air interface usage can be reduced. In addition, based on an actual requirement, an amount of signaling and an air interface usage in one or more phases of transmission from the target base station to the source base station, transmission from the source base station to the terminal, and transmission from the terminal to the target base station can be reduced, thereby improving switching efficiency of the terminal having a plurality of SIM cards during base station switching.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this application are generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing embodiments may be used to explain and describe the following embodiments.

Embodiment 1

A base station switching method is provided and is applied to a terminal having a plurality of SIM cards, and the method includes:
  sending, by the terminal, one piece of binding signaling that carries SIM card binding information to a source base station, where the SIM card binding information includes information about the plurality of SIM cards in the terminal;
  receiving, by the terminal, radio resource control reconfiguration information sent by the source base station, where the radio resource control reconfiguration information includes the information about the plurality of SIM cards and configuration parameters used by the plurality of SIM cards to connect to a target base station;
  switching, by the terminal, the plurality of SIM cards from being connected to the source base station to being connected to the target base station; and
  sending, by the terminal, radio resource control reconfiguration complete information to the target base station, where the radio resource control reconfiguration complete information includes the information about the plurality of SIM cards that complete the switching operation.

Embodiment 2

According to the method in Embodiment 1, the information about the plurality of SIM cards includes identification information of the plurality of SIM cards, and the identification information is one or more of an international mobile equipment identity, a mobile equipment identifier, an international mobile subscriber identity, a temporary mobile subscriber identity, a packet-temporary mobile subscriber identity, an integrate circuit card identity, a mobile subscriber ISDN number, a mobile station roaming number, a product serial number, and a radio network temporary identity.

Embodiment 3

According to the method in Embodiment 1 or 2, the information about the plurality of SIM cards includes information about radio resource control statuses between the plurality of SIM cards and the source base station.

Embodiment 4

According to the method in any one of Embodiments 1 to 3, before the receiving, by the terminal, radio resource control reconfiguration information sent by the source base station, the method includes:
  receiving, by the terminal, a terminal status switching instruction sent by the source base station; and
  instructing, by the terminal according to the terminal status switching instruction, each SIM card to switch a status between the SIM card and the source base station to a connected state.

Embodiment 5

According to the method in Embodiment 4, the terminal status switching instruction includes a first status switching instruction and/or a second status switching instruction;
  the terminal indicates, according to the first status switching instruction, a disconnected SIM card in the plurality of SIM cards to connect to the source base station, where the disconnected SIM card is a SIM card whose radio resource control status with the source base station is an idle state; and
  the terminal indicates, according to the second status switching instruction, an inactive SIM card in the plurality of SIM cards to switch from an inactive state for the source base station to a connected state, where the inactive SIM card is a SIM card whose radio resource control status with the source base station is the inactive state.

Embodiment 6

According to the method in any one of Embodiments 1 to 5, the information about the plurality of SIM cards includes a type of a source core network connected to the plurality of SIM cards, and the type of the source core network is a type of a core network provided by the source base station.

Embodiment 7

According to the method in any one of Embodiments 1 to 6, the SIM card binding information includes a binding relationship between the plurality of SIM cards.

Embodiment 8

According to the method in Embodiment 7, the binding relationship is information that uses 1/0 to indicate whether the plurality of SIM cards are bound/not bound.

Embodiment 9

According to the method in any one of Embodiments 1 to 8, the terminal receives the radio resource control reconfiguration information sent by the source base station at a time, where the radio resource control reconfiguration information includes the SIM card binding information and the configuration parameters used by the plurality of SIM cards to connect to the target base station.

Embodiment 10

According to the method in any one of Embodiments 1 to 8, the terminal receives the radio resource control reconfiguration information sent by the source base station at a plurality of times, where the radio resource control reconfiguration information includes a plurality of pieces of sub-radio resource control reconfiguration information, and the sub-radio resource control reconfiguration information includes information about a single SIM card in the plurality of SIM cards and a configuration parameter used by the single SIM card to connect to the target base station.

Embodiment 11

According to the method in any one of Embodiments 1 to 10, the configuration parameters used by the plurality of SIM cards to connect to the target base station include a type of a target core network, and the type of the target core network is a type of a core network provided by the target base station.

Embodiment 12

According to the method in Embodiments 1 to 11, the switching, by the terminal, the plurality of SIM cards from being connected to the source base station to being connected to the target base station includes:
  indicating, by the terminal based on the information about the plurality of SIM cards, the plurality of SIM cards to correspondingly obtain the configuration parameters used by the plurality of SIM cards to connect to the target base station; and
  indicating, by the terminal, the plurality of SIM cards to switch from being connected to the source base station to being connected to the target base station based on the configuration parameters used by the plurality of SIM cards to connect to the target base station.

Embodiment 13

According to the method in any one of Embodiments 1 to 12, the terminal sends the radio resource control reconfiguration complete information to the target base station at a time, where the radio resource control reconfiguration complete information includes the SIM card binding information.

Embodiment 14

According to the method in any one of Embodiments 1 to 12, the terminal sends the radio resource control reconfiguration complete information to the target base station at a plurality of times, where the radio resource control reconfiguration complete information includes a plurality of pieces of sub-radio resource control reconfiguration complete information, and the sub-radio resource control reconfiguration complete information includes information about a single SIM card in the plurality of SIM cards that completes the switching operation.

Embodiment 15

A base station switching method is provided and is applied to a source base station connected to a terminal having a plurality of SIM cards, and the method includes:
  receiving, by the source base station, one piece of binding signaling that carries SIM card binding information and that is sent by the terminal, where the SIM card binding information includes information about the plurality of SIM cards in the terminal;
  sending, by the source base station, one piece of switching request signaling to a target base station, where the switching request signaling includes the SIM card binding information;
  receiving, by the source base station, radio resource control reconfiguration information sent by the target base station, where the radio resource control reconfiguration information includes the information about the plurality of SIM cards and configuration parameters used by the plurality of SIM cards to connect to the target base station; and
  sending, by the source base station, the radio resource control reconfiguration information to the terminal.

Embodiment 16

According to the method in Embodiment 15, the information about the plurality of SIM cards includes identification information of the plurality of SIM cards, and the identification information is one or more of an international mobile equipment identity, a mobile equipment identifier, an international mobile subscriber identity, a temporary mobile subscriber identity, a packet-temporary mobile subscriber identity, an integrate circuit card identity, a mobile subscriber ISDN number, a mobile station roaming number, a product serial number, and a radio network temporary identity.

Embodiment 17

According to the method in Embodiment 15 or 16, the information about the plurality of SIM cards includes a type of a source core network connected to the plurality of SIM cards, and the type of the source core network is a type of a core network provided by the source base station.

Embodiment 18

According to the method in any one of Embodiments 15 to 17, the SIM card binding information includes a binding relationship between the plurality of SIM cards.

Embodiment 19

According to the method in Embodiment 18, the binding relationship is information that uses 1/0 to indicate whether the plurality of SIM cards are bound/not bound.

Embodiment 20

According to the method in Embodiments 15 to 19, the information about the plurality of SIM cards includes information about radio resource control statuses between the plurality of SIM cards and the source base station.

Embodiment 21

According to the method in Embodiment 20, after the source base station receives the SIM card binding information sent by the terminal, the method includes:
  generating, by the source base station, a terminal status switching instruction based on the information about the radio resource control statuses between the plurality of SIM cards and the source base station; and sending, by the source base station, the terminal status switching instruction to the terminal.

Embodiment 22

According to the method in Embodiment 21, the terminal status switching instruction includes a first status switching instruction and/or a second status switching instruction;

the first status switching instruction is used by the terminal to indicate a disconnected SIM card in the plurality of SIM cards to connect to the source base station, where the disconnected SIM card is a SIM card whose radio resource control status with the source base station is an idle state; and the second status switching instruction is used by the terminal to indicate an inactive SIM card in the plurality of SIM cards to switch from an inactive state for the source base station to a connected state, where the inactive SIM card is a SIM card whose radio resource control status with the source base station is the inactive state.

Embodiment 23

According to the method in any one of Embodiments 15 to 22, the source base station receives the radio resource control reconfiguration information sent by the target base station at a time, where the radio resource control reconfiguration information includes the SIM card binding information and the configuration parameters used by the plurality of SIM cards to connect to the target base station.

Embodiment 24

According to the method in any one of Embodiments 15 to 22, the source base station receives the radio resource control reconfiguration information sent by the target base station at a plurality of times, where the radio resource control reconfiguration information includes a plurality of pieces of sub-radio resource control reconfiguration information, and the sub-radio resource control reconfiguration information includes information about a single SIM card in the plurality of SIM cards and a configuration parameter used by the single SIM card to connect to the target base station.

Embodiment 25

According to the method in any one of Embodiments 15 to 24, the configuration parameters used by the plurality of SIM cards to connect to the target base station include a type of a target core network, and the type of the target core network is a type of a core network provided by the target base station.

Embodiment 26

According to the method in any one of Embodiments 15 to 25, the source base station sends the radio resource control reconfiguration information to the terminal at a time, where the radio resource control reconfiguration information includes the SIM card binding information and the configuration parameters used by the plurality of SIM cards to connect to the target base station.

Embodiment 27

According to the method in any one of Embodiments 15 to 25, the source base station sends the radio resource control reconfiguration information to the terminal at a plurality of times, where the radio resource control reconfiguration information includes a plurality of pieces of sub-radio resource control reconfiguration information, and the sub-radio resource control reconfiguration information includes information about a single SIM card in the plurality of SIM cards and a configuration parameter used by the single SIM card to connect to the target base station.

Embodiment 28

A base station switching method is provided and is applied to a target base station connected to a terminal having a plurality of SIM cards, and the method includes:

receiving, by the target base station, one piece of switching request signaling sent by a source base station, where the switching request signaling includes SIM card binding information, and the SIM card binding information includes information about the plurality of SIM cards in the terminal;

generating, by the target base station, radio resource control reconfiguration information based on the SIM card binding information, where the radio resource control reconfiguration information includes the SIM card binding information and configuration information used by the plurality of SIM cards to connect to the target base station;

sending, by the target base station, the radio resource control reconfiguration information to the source base station; and receiving, by the target base station, radio resource control reconfiguration complete information sent by the terminal, where the radio resource control reconfiguration complete information includes the information about the plurality of SIM cards that complete the switching operation.

Embodiment 29

According to the method in Embodiment 28, the information about the plurality of SIM cards includes identification information of the plurality of SIM cards, and the identification information is one or more of an international mobile equipment identity, a mobile equipment identifier, an international mobile subscriber identity, a temporary mobile subscriber identity, a packet-temporary mobile subscriber identity, an integrate circuit card identity, a mobile subscriber ISDN number, a mobile station roaming number, a product serial number, and a radio network temporary identity.

Embodiment 30

According to the method in Embodiment 28 or 29, the information about the plurality of SIM cards includes information about radio resource control statuses between the plurality of SIM cards and the source base station.

Embodiment 31

According to the method in any one of Embodiments 28 to 30, the information about the plurality of SIM cards includes a type of a source core network connected to the plurality of SIM cards, and the type of the source core network is a type of a core network provided by the source base station.

Embodiment 32

According to the method in any one of Embodiments 28 to 31, the SIM card binding information includes a binding relationship between the plurality of SIM cards.

Embodiment 33

According to the method in Embodiment 32, the binding relationship is information that uses 1/0 to indicate whether the plurality of SIM cards are bound/not bound.

Embodiment 34

According to the method in any one of Embodiments 28 to 32, the target base station sends the radio resource control reconfiguration information to the source base station at a time, where the radio resource control reconfiguration information includes the SIM card binding information and the configuration parameters used by the plurality of SIM cards to connect to the target base station.

Embodiment 35

According to the method in any one of Embodiments 28 to 32,
the target base station sends the radio resource control reconfiguration information to the source base station at a plurality of times, where the radio resource control reconfiguration information includes a plurality of pieces of sub-radio resource control reconfiguration information, and the sub-radio resource control reconfiguration information includes information about a single SIM card in the plurality of SIM cards and a configuration parameter used by the single SIM card to connect to the target base station.

Embodiment 36

According to the method in any one of Embodiments 28 to 35, the configuration parameters used by the plurality of SIM cards to connect to the target base station include a type of a target core network, and the type of the target core network is a type of a core network provided by the target base station.

Embodiment 37

According to the method in any one of Embodiments 28 to 36, the target base station receives the radio resource control reconfiguration complete information sent by the terminal at a time, where the radio resource control reconfiguration complete information includes the SIM card binding information.

Embodiment 38

According to the method in any one of Embodiments 28 to 36, the target base station receives the radio resource control reconfiguration complete information sent by the terminal at a plurality of times, where the radio resource control reconfiguration complete information includes a plurality of pieces of sub-radio resource control reconfiguration complete information, and the sub-radio resource control reconfiguration complete information includes information about a single SIM card in the plurality of SIM cards that completes the switching operation.

Embodiment 39

According to the method in Embodiments 28 to 38, before the target base station generates the radio resource control reconfiguration information based on the information about the plurality of SIM cards, the method includes:
obtaining, by the target base station, a current quantity of connected SIM cards; and
if the current quantity of connected SIM cards is greater than a preset SIM card quantity threshold, sending, by the target base station, a switching prohibition response to the source base station.

Embodiment 40

A base station switching apparatus is provided and is applied to a terminal having a plurality of SIM cards, and includes a transmitter, a receiver, and a processor.

The transmitter is configured to send one piece of binding signaling that carries SIM card binding information to a source base station, where the SIM card binding information includes information about a plurality of SIM cards in a terminal.

The receiver is configured to receive radio resource control reconfiguration information sent by the source base station, where the radio resource control reconfiguration information includes the information about the plurality of SIM cards and configuration parameters used by the plurality of SIM cards to connect to a target base station.

The processor is configured to switch the plurality of SIM cards from being connected to the source base station to being connected to the target base station.

The transmitter is further configured to send radio resource control reconfiguration complete information to the target base station, where the radio resource control reconfiguration complete information includes the information about the plurality of SIM cards that complete the switching operation.

Embodiment 41

According to the apparatus in Embodiment 40,
the receiver is further configured to receive a terminal status switching instruction sent by the source base station; and
the processor is further configured to instruct the plurality of SIM cards to switch statuses between the plurality of SIM cards and the source base station to a connected state according to the terminal status switching instruction.

Embodiment 42

According to the apparatus in Embodiment 41, the terminal status switching instruction includes a first status switching instruction and/or a second status switching instruction.

The processor is further configured to indicate, according to the first status switching instruction, a disconnected SIM card in the plurality of SIM cards to connect to the source base station, where the disconnected SIM card is a SIM card whose radio resource control status with the source base station is an idle state.

The processor is further configured to indicate, according to the second status switching instruction, an inactive SIM card in the plurality of SIM cards to switch from an inactive state for the source base station to a connected state, where the inactive SIM card is a SIM card whose radio resource control status with the source base station is the inactive state.

Embodiment 43

According to the apparatus in any one of Embodiments 40 to 42, the receiver is further configured to receive the radio resource control reconfiguration information sent by the source base station at a time, where the radio resource control reconfiguration information includes the SIM card binding information and the configuration parameters used by the plurality of SIM cards to connect to the target base station.

Embodiment 44

According to the apparatus in any one of Embodiments 40 to 42, the receiver is further configured to receive the radio resource control reconfiguration information sent by the source base station at a plurality of times, where the radio resource control reconfiguration information includes a plurality of pieces of sub-radio resource control reconfiguration information, and the sub-radio resource control reconfiguration information includes information about a single SIM card in the plurality of SIM cards and a configuration parameter used by the single SIM card to connect to the target base station.

Embodiment 45

According to the apparatus in any one of Embodiments 40 to 44,
   the processor is further configured to indicate, based on the information about the plurality of SIM cards, the plurality of SIM cards to correspondingly obtain the configuration parameters used by the plurality of SIM cards to connect to the target base station; and
   the processor is further configured to indicate the plurality of SIM cards to switch from being connected to the source base station to being connected to the target base station based on the configuration parameters used by the plurality of SIM cards to connect to the target base station.

Embodiment 46

According to the apparatus in any one of Embodiments 40 to 45, the transmitter is configured to send the radio resource control reconfiguration complete information to the target base station at a time, where the radio resource control reconfiguration complete information includes the SIM card binding information.

Embodiment 47

According to the apparatus in any one of Embodiments 40 to 45, the transmitter is further configured to send the radio resource control reconfiguration complete information to the target base station at a plurality of times, where the radio resource control reconfiguration complete information includes a plurality of pieces of sub-radio resource control reconfiguration complete information, and the sub-radio resource control reconfiguration complete information includes information about a single SIM card in the plurality of SIM cards that completes the switching operation.

Embodiment 48

A base station switching apparatus is provided and is applied to a source base station connected to a terminal having a plurality of SIM cards, and includes a transmitter and a receiver.

The receiver is configured to receive one piece of binding signaling that carries SIM card binding information and that is sent by the terminal, where the SIM card binding information includes information about the plurality of SIM cards in the terminal.

The transmitter is configured to send one piece of switching request signaling to a target base station, where the switching request signaling includes the SIM card binding information.

The receiver is further configured to receive radio resource control reconfiguration information sent by the target base station, where the radio resource control reconfiguration information includes the information about the plurality of SIM cards and configuration parameters used by the plurality of SIM cards to connect to the target base station.

The transmitter is further configured to send the radio resource control reconfiguration information to the terminal.

Embodiment 49

According to the apparatus in Embodiment 48, the apparatus further includes a processor.

The processor is configured to generate a terminal status switching instruction based on radio resource control statuses between the plurality of SIM cards and the source base station.

The transmitter is further configured to send the terminal status switching instruction to the terminal.

Embodiment 50

According to the apparatus in Embodiment 49, the terminal status switching instruction includes a first status switching instruction and/or a second status switching instruction.

The first status switching instruction is used to instruct a disconnected SIM card in the plurality of SIM cards to connect to the source base station, where the disconnected SIM card is a SIM card whose radio resource control status with the source base station is an idle state.

The second status switching instruction is used to instruct an inactive SIM card in the plurality of SIM cards to switch from an inactive state for the source base station to a connected state, where the inactive SIM card is a SIM card whose radio resource control status with the source base station is the inactive state.

Embodiment 51

According to the apparatus in Embodiments 48 to 50, the receiver is configured to receive the radio resource control reconfiguration information sent by the target base station at a time, where the radio resource control reconfiguration information includes the SIM card binding information and the configuration parameters used by the plurality of SIM cards to connect to the target base station.

Embodiment 52

According to the apparatus in Embodiments 48 to 50, the receiver is configured to receive the radio resource control reconfiguration information sent by the target base station at a plurality of times, where the radio resource control reconfiguration information includes a plurality of pieces of sub-radio resource control reconfiguration information, and the sub-radio resource control reconfiguration information includes information about a single SIM card in the plurality of SIM cards and a configuration parameter used by the single SIM card to connect to the target base station.

Embodiment 53

According to the apparatus in Embodiments 48 to 52, the transmitter is configured to send the radio resource control reconfiguration information to the terminal at a time, where the radio resource control reconfiguration information includes the SIM card binding information and the configuration parameters used by the plurality of SIM cards to connect to the target base station.

Embodiment 54

According to the apparatus in any one of Embodiments 48 to 52, the transmitter is configured to send the radio resource control reconfiguration information to the terminal at a plurality of times, where the radio resource control reconfiguration information includes a plurality of pieces of sub-radio resource control reconfiguration information, and the sub-radio resource control reconfiguration information includes information about a single SIM card in the plurality of SIM cards and a configuration parameter used by the single SIM card to connect to the target base station.

Embodiment 55

A base station switching apparatus is provided and is applied to a target base station connected to a terminal having a plurality of SIM cards, and includes a transmitter, a receiver, and a processor.

The receiver is configured to receive one piece of switching request signaling sent by a source base station, where the switching request signaling includes SIM card binding information, and the SIM card binding information includes information about the plurality of SIM cards in the terminal.

The processor is configured to generate radio resource control reconfiguration information based on the information about the plurality of SIM cards, where the radio resource control reconfiguration information includes the information about the plurality of SIM cards and configuration information used by the plurality of SIM cards to connect to the target base station.

The transmitter is configured to send the radio resource control reconfiguration information to the source base station.

The receiver is configured to receive radio resource control reconfiguration complete information sent by the terminal, where the radio resource control reconfiguration complete information includes the information about the plurality of SIM cards that complete the switching operation.

Embodiment 56

According to the apparatus in Embodiment 55, the transmitter is further configured to send the radio resource control reconfiguration information to the source base station at a time, where the radio resource control reconfiguration information includes the SIM card binding information and the configuration parameters used by the plurality of SIM cards to connect to the target base station.

Embodiment 57

According to the apparatus in Embodiment 55, the transmitter is further configured to send the radio resource control reconfiguration information to the source base station at a plurality of times, where the radio resource control reconfiguration information includes a plurality of pieces of sub-radio resource control reconfiguration information, and the sub-radio resource control reconfiguration information includes information about a single SIM card in the plurality of SIM cards and a configuration parameter used by the single SIM card to connect to the target base station.

Embodiment 58

According to the method in any one of Embodiments 55 to 57, the receiver is further configured to receive the radio resource control reconfiguration complete information sent by the terminal at a time, where the radio resource control reconfiguration complete information includes the SIM card binding information.

Embodiment 59

According to the method in any one of Embodiments 55 to 57, the receiver is further configured to receive the radio resource control reconfiguration complete information sent by the terminal at a plurality of times, where the radio resource control reconfiguration complete information includes a plurality of pieces of sub-radio resource control reconfiguration complete information, and the sub-radio resource control reconfiguration complete information includes information about a single SIM card in the plurality of SIM cards that completes the switching operation.

Embodiment 60

According to the apparatus in any one of Embodiments 55 to 59,
the processor is configured to obtain a current quantity of connected SIM cards; and
the transmitter is configured to send a switching prohibition response to the source base station if the current quantity of connected SIM cards is greater than a preset SIM card quantity threshold.

Embodiment 61

A computer storage medium is provided. The computer-readable storage medium stores computer instructions, and when the computer instructions are run on a terminal having a plurality of SIM cards, the terminal having a plurality of SIM cards is enabled to perform the base station switching method according to any one of Embodiments 1 to 14.

Embodiment 62

A computer storage medium is provided. The computer-readable storage medium stores computer instructions, and when the computer instructions are run on a source base station connected to a terminal having a plurality of SIM cards, the source base station is enabled to perform the base station switching method according to any one of Embodiments 15 to 27.

Embodiment 63

A computer storage medium is provided. The computer-readable storage medium stores computer instructions, and when the computer instructions are run on a target base station connected to a terminal having a plurality of SIM cards, the target base station is enabled to perform the base station switching method according to any one of Embodiments 28 to 39.

Embodiment 64

A computer program product including instructions is provided. When the computer program product runs on a terminal having a plurality of SIM cards, the terminal having a plurality of SIM cards is enabled to perform the base station switching method according to any one of Embodiments 1 to 14.

Embodiment 65

A computer program product including instructions is provided. When the computer program product runs on a source base station connected to a terminal having a plurality of SIM cards, the source base station is enabled to perform the base station switching method according to any one of Embodiments 15 to 27.

Embodiment 66

A computer program product including instructions is provided. When the computer program product runs on a target base station connected to a terminal having a plurality of SIM cards, the target base station is enabled to perform the base station switching method according to any one of Embodiments 28 to 39.

Embodiment 67

A chip system is provided. The chip system is configured to support a terminal having a plurality of SIM cards in implementing the base station switching method according to any one of Embodiments 1 to 14.

Embodiment 68

A chip system is provided. The chip system is configured to support a source base station connected to a terminal having a plurality of SIM cards in implementing the base station switching method according to any one of Embodiments 15 to 27.

Embodiment 69

A chip system is provided. The chip system is configured to support a target base station connected to a terminal having a plurality of SIM cards in implementing the base station switching method according to any one of Embodiments 28 to 39.

Embodiment 70

A communications system is provided, and includes one or more communications devices and one or more communications apparatuses.

What is claimed is:

1. A method, applied to a terminal having a plurality of subscriber identification module (SIM) cards, and comprising:
    sending, by the terminal to a source base station, one piece of binding signaling that carries SIM card binding information, wherein the SIM card binding information comprises information about the plurality of SIM cards of the terminal;
    receiving, by the terminal, radio resource control reconfiguration information sent by the source base station, wherein the radio resource control reconfiguration information comprises the information about the plurality of SIM cards and configuration parameters used by the terminal to connect the plurality of SIM cards to a target base station;
    switching, by the terminal in a switching operation based on the configuration parameters, the plurality of SIM cards from being connected to the source base station to being connected to the target base station; and
    sending, by the terminal, radio resource control reconfiguration complete information to the target base station, wherein the radio resource control reconfiguration complete information comprises the information about the plurality of SIM cards that complete the switching operation.

2. The method according to claim 1, wherein the information about the plurality of SIM cards comprises identification information of the plurality of SIM cards, and the identification information is one or more of an international mobile equipment identity, a mobile equipment identifier, an international mobile subscriber identity, a temporary mobile subscriber identity, a packet-temporary mobile subscriber identity, an integrated circuit card identity, a mobile subscriber integrated services digital network (ISDN) number, a mobile station roaming number, a product serial number, or a radio network temporary identity.

3. The method according to claim 1, wherein the information about the plurality of SIM cards comprises information about radio resource control statuses between the plurality of SIM cards and the source base station.

4. The method according to claim 1, wherein before the receiving, by the terminal, the radio resource control reconfiguration information sent by the source base station, the method comprises:
    receiving, by the terminal, a terminal status switching instruction sent by the source base station; and
    instructing, by the terminal according to the terminal status switching instruction, each SIM card to switch a status between a corresponding SIM card and the source base station to a connected state.

5. The method according to claim 4, wherein the terminal status switching instruction comprises a first status switching instruction or a second status switching instruction;
    the terminal indicates, according to the first status switching instruction, a disconnected SIM card in the plurality of SIM cards to connect to the source base station, wherein the disconnected SIM card is a SIM card of which radio resource control status with the source base station is an idle state; and
    the terminal indicates, according to the second status switching instruction, an inactive SIM card in the plurality of SIM cards to switch from an inactive state with the source base station to a connected state with the source base station, wherein the inactive SIM card is a SIM card of which radio resource control status with the source base station is the inactive state.

6. The method according to claim 1, wherein the information about the plurality of SIM cards comprises a type of a source core network connected to the plurality of SIM cards, and the type of the source core network is a type of a core network provided by the source base station.

7. The method according to claim 1, wherein the SIM card binding information comprises a binding relationship between the plurality of SIM cards.

8. The method according to claim 7, wherein the binding relationship indicates whether the plurality of SIM cards are bound.

9. The method according to claim 1, wherein
the terminal receives the radio resource control reconfiguration information once, wherein the radio resource control reconfiguration information comprises the SIM card binding information and the configuration parameters used by the plurality of SIM cards to connect to the target base station.

10. The method according to claim 1, wherein
the terminal receives the radio resource control reconfiguration information sent by the source base station for a plurality of times, wherein the radio resource control reconfiguration information comprises a plurality of pieces of sub-radio resource control reconfiguration information, and each sub-radio resource control reconfiguration information comprises information about a single SIM card in the plurality of SIM cards and a configuration parameter used by the terminal to connect the single SIM card to the target base station.

11. The method according to claim 1, wherein the configuration parameters comprise a type of a target core network, and the type of the target core network is a type of a core network provided by the target base station.

12. The method according to claim 1, wherein the switching, by the terminal, the plurality of SIM cards from being connected to the source base station to being connected to the target base station comprises:
indicating, by the terminal based on the information about the plurality of SIM cards, the plurality of SIM cards to obtain the configuration parameters respectively; and
indicating, by the terminal, the plurality of SIM cards to switch from being connected to the source base station to being connected to the target base station based on the respective configuration parameters.

13. The method according to claim 1, wherein
the terminal sends the radio resource control reconfiguration complete information to the target base station once, wherein the radio resource control reconfiguration complete information comprises the SIM card binding information.

14. The method according to claim 1, wherein
the terminal sends the radio resource control reconfiguration complete information to the target base station for a plurality of times, the radio resource control reconfiguration complete information comprises a plurality of pieces of sub-radio resource control reconfiguration complete information, and each sub-radio resource control reconfiguration complete information comprises information about a single SIM card in the plurality of SIM cards that completes the switching operation.

15. A method, applied to a source base station connected to a terminal having a plurality of subscriber identification module (SIM) cards, and comprising:
receiving, by the source base station, one piece of binding signaling that carries SIM card binding information and that is sent by the terminal, wherein the SIM card binding information comprises information about the plurality of SIM cards of the terminal;
sending, by the source base station, one piece of switching request signaling to a target base station, wherein the one piece of switching request signaling comprises the SIM card binding information and requests base station switching for the plurality of SIM cards;
receiving, by the source base station, radio resource control reconfiguration information sent by the target base station, wherein the radio resource control reconfiguration information comprises the information about the plurality of SIM cards and configuration parameters used to connect the plurality of SIM cards to the target base station; and
sending, by the source base station, the radio resource control reconfiguration information to the terminal.

16. The method according to claim 15, wherein the information about the plurality of SIM cards comprises:
identification information of the plurality of SIM cards, and the identification information is one or more of an international mobile equipment identity, a mobile equipment identifier, an international mobile subscriber identity, a temporary mobile subscriber identity, a packet-temporary mobile subscriber identity, an integrated circuit card identity, a mobile subscriber integrated services digital network (ISDN) number, a mobile station roaming number, a product serial number, or a radio network temporary identity.

17. The method according to claim 15, wherein the information about the plurality of SIM cards comprises:
a type of a source core network connected to the plurality of SIM cards, wherein the type of the source core network is a type of a core network provided by the source base station.

18. The method according to claim 15, wherein the SIM card binding information comprises:
a binding relationship between the plurality of SIM cards.

19. The method according to claim 18, wherein the binding relationship indicates whether the plurality of SIM cards are bound.

20. A terminal device, comprising a non-transitory memory, a processor, and a computer program that is stored in the memory and that is executable on the processor, wherein when executing the computer program, the processor implements following steps:
sending, to a source base station, one piece of binding signaling that carries subscriber identification module (SIM) card binding information, wherein the SIM card binding information comprises information about a plurality of SIM cards of the terminal device;
receiving radio resource control reconfiguration information sent by the source base station, wherein the radio resource control reconfiguration information comprises the information about the plurality of SIM cards and configuration parameters used by the terminal device to connect the plurality of SIM cards to a target base station;
switching, in a switching operation based on the configuration parameters, the plurality of SIM cards from being connected to the source base station to being connected to the target base station; and sending radio resource control reconfiguration complete information to the target base station, wherein the radio resource control reconfiguration complete information comprises the information about the plurality of SIM cards that complete the switching operation.

* * * * *